(12) United States Patent
Cheung

(10) Patent No.: US 7,377,013 B2
(45) Date of Patent: May 27, 2008

(54) ADJUSTABLE AND DETACHABLE BINDING DEVICE

(76) Inventor: Yingfai Cheung, 1930 New Ave., #G, San Gabriel, CA (US) 91776

( * ) Notice: Subject to any disclaimer, the term of this patent is extended or adjusted under 35 U.S.C. 154(b) by 12 days.

(21) Appl. No.: 11/506,710

(22) Filed: Aug. 18, 2006

(65) Prior Publication Data

US 2006/0277723 A1 Dec. 14, 2006

Related U.S. Application Data

(63) Continuation-in-part of application No. 10/725,094, filed on Dec. 2, 2003, now abandoned.

(51) Int. Cl.
*B65D 63/00* (2006.01)
*B65D 33/00* (2006.01)
(52) U.S. Cl. .................... 24/16 PB; 24/30.5 P
(58) Field of Classification Search .............. 24/16 PB, 24/17 A, 30.5 P, 30.5 R, 17 AP; D8/394, D8/396; 248/351, 74.3
See application file for complete search history.

(56) References Cited

U.S. PATENT DOCUMENTS

| 216,543 | A | * | 6/1879 | Weaver | 24/17 A |
|---|---|---|---|---|---|
| 1,810,027 | A | * | 6/1931 | Moran et al. | 24/17 AP |
| 2,961,785 | A | * | 11/1960 | Toepfer | 24/16 PB |
| 3,913,179 | A | * | 10/1975 | Rhee | 24/16 PB |
| 5,581,850 | A | * | 12/1996 | Acker | 24/16 PB |
| 5,878,520 | A | * | 3/1999 | Milbrandt et al. | 24/16 PB |
| 6,192,554 | B1 | * | 2/2001 | Dumcum | 24/16 PB |

* cited by examiner

*Primary Examiner*—Robert J. Sandy
(74) *Attorney, Agent, or Firm*—Raymond Y. Chan; David and Raymond Patent Firm

(57) ABSTRACT

An adjustable and detachable binding device includes an elongated binding member, a plurality of locking holders spacedly and integrally formed along a tail portion of the binding member, and a loop locker integrally formed at a head portion of the binding member to detachably engage with one of the locking holders to form a binding loop of the binding member for fittingly binding up an object, wherein the loop locker is shaped and sized that enables the loop locker to be detachably engaged with the respective locking holder, so as to adjust a diameter of the binding loop of the binding member with respect to the object.

20 Claims, 20 Drawing Sheets

ADJUSTABLE AND DETACHABLE BINDING DEVICE

CROSS-REFERENCE OF RELATED APPLICATION

This is a Continuation-In-Part application of a non-provisional application having an application Ser. No. 10/725,094 and a filing date of Dec. 02, 2003 now abandoned.

BACKGROUND OF THE PRESENT INVENTION

1. Field of Invention

The present invention relates to a binding device, and more particularly to an adjustable and detachable binding device for binding up an object, wherein the binding device is adapted to not only selectively adjust a loop size to fit the diameter of the object but also detach from the object while the binding device can be reused to bind up the object due to the change of the diameter of the object.

2. Description of Related Arts

Traditionally, people used strings, ropes and zip locks as binding fasteners in industrial and routine duty practice. Recently, disposable plastic fasteners have been widely used. Compared with traditional fastening means, like rope, plastic fasteners have a variety of distinctive advantages such as convenience, lower costs, simplicity, free of corrosion, water proof, strength, and so on. As a result, plastic fasteners have replaced traditional fastening means in more and more applications.

Just as its name applies, fasteners are adapted for tying up or binding different objects tightly in position. Fasteners could be bent or deformed to define a loop boundary wherein objects were bind within. Those traditional binding devices including plastic fasteners are all shown satisfied performance according to this aspect. However, in many occasions, users not only need fastener to provide tight binding function, but also request fastener to be adjustable and detachable.

For instance, the most notorious binding device application is of gardening practice, especially in vineyard or orchard. To seek richer productivity, young growth plants would be bound with wood frames or standing rods to keep corrected extending direction. Meanwhile, some fruitful trees, which occupy large area, need to be bound for gust resistance. Therefore, gardeners should tie those plants with wood frames or rods by ropes or whatever binding means. Unfortunately, the diameters of plants, especially of those seedlings or young growth trees, changed from year to year. If the ropes or fasteners were too tight, the nutrition passage of plants would be restricted thus causing plants wither and yellow, even to the extent death. Therefore, gardeners have to adjust the fasteners' loop diameters from season to season. Here, it could be seen that traditional fastening devices have huge drawbacks.

If ropes or strings were fastened in detachable knots, the tight tension could not be guaranteed. Instead, if the dead knots were applied, gardeners would have to cut the ropes or strings to break the knots first, and then bind the plants again with new ropes. This procedure is time consuming and raw materials wasting. What is more, if the strings were made of metal materials, breaking process would be rather frustrating. On the other hand, the gardeners would have to carry plenty of new fastening devices to replace the old ones. It is hard to imagine that one gardener would bind all plants in an orchard of more than thousands of peach trees.

Another example, people sometimes would have to deal with bundles of different wires like cables, telephone lines, ordinary electrical lines, etc. To achieve a neat looking appearance, binding those cables with fasteners would be a good idea. However, if a user wishes to adjust the fastener, he or she may merely cut the fastener. The nonadjustable fastening devices do cause a lot of inconvenience.

Plastic fasteners are proven having adjustable function in comparison with traditional fastening means like rope. Nevertheless, it could be adjusted in unidirectional way instead of double direction. This is due to the fact plastic fastener for binding purpose is strip shaped and has an elongated body wherein a plurality of closely spaced zigzag teeth were formed on the down portion of its elongated body, while its top portion was formed with corresponding locking arrangement. In practice, users could bend the strip to form a loop structure, and insert the teeth end of elongated body into the slot of locking end until the zigzag teeth fully engaged with the lock thus fastening objects inside the loop. Here, the problem is that once the teeth were engaged with the lock, it could not be adjustable reversely. In other word, this kind of plastic fastener is only for tightening not for loosing up.

Therefore, adding an additional cable with the bound cables or removing one of the bound cables would eventually change the diameters of the loop. Users might merely cut the fastener, or else, have to use an additional fastener.

In brief, detaching and adjusting fasteners have been a perplexing problem for our lives. A kind of fasteners comprising detachable and adjustable function is highly desirable.

SUMMARY OF THE PRESENT INVENTION

A main object of the present invention is to provide an adjustable and detachable binding device, which is adapted to not only selectively adjusting a loop size to fit the diameter of the object but also detached from the object while the binding device can be reused to bind up the object due to the change of the diameter of the object.

Another object of the present invention is to provide an adjustable and detachable binding device, which comprises a plurality of locking holders spacedly provided at a tail portion of an elongated binding member and a loop locker integrally provide at a head portion of the elongated binding member to detachably engage with one of the locking holders to form a binding loop for binding at the object.

Another object of the present invention is to provide an adjustable and detachable binding device, wherein the loop locker is shaped and sized corresponding to the locking holders to securely engage with one of the locking holders in a detachably attaching manner such that the binding member can be reused to adjust the binding loop thereof for fitting the diameter of the object. In other words, the user is able to keep the binding device to bind the object even the diameter of the object has changed.

Another object of the present invention is to provide an adjustable and detachable binding device, wherein the binding operation of the binding device is quick and easy that by simply attaching the loop locker with the respective locking holder. In other words, the detaching operation of the binding device is rapid by detaching the loop locker with the respective locking holder.

Another object of the present invention is to provide an adjustable and detachable binding device, wherein the manufacturing process is easy and simple such that the binding device of the present invention can be mass produced in a low manufacturing cost.

Another object of the present invention is to provide an adjustable and detachable binding device, wherein no expensive or complicated structure is required to employ in the present invention in order to achieve the above mentioned objects. Therefore, the present invention successfully provides an economic and efficient solution not only for adjusting the loop size of the binding device to fit the object but also for reusing the binding device due to the change of the diameter of the object so as to facilitate the practical use of the binding device.

Accordingly, in order to accomplish the object, the present invention provides an adjustable and detachable binding device for binding up an object, comprising:

an elongated binding member having a head end, an opposed tail end, a head portion defining at the head end, and a tail portion defining at the tail end;

a plurality of locking holders spacedly and integrally formed along the tail portion of the binding member; and a loop locker integrally formed at the head portion of the binding member to detachably engage with one of the locking holders to form a binding loop of the binding member for fittingly binding up the object, wherein the loop locker is shaped and sized that enables the loop locker to be detachably engaged with the respective locking holder, so as to adjust a diameter of the binding loop of the binding member with respect to the object.

These and other objectives, features, and advantages of the present invention will become apparent from the following detailed description, the accompanying drawings, and the appended claims.

DETAILED DESCRIPTION OF THE PREFERRED EMBODIMENT

Figure 1:
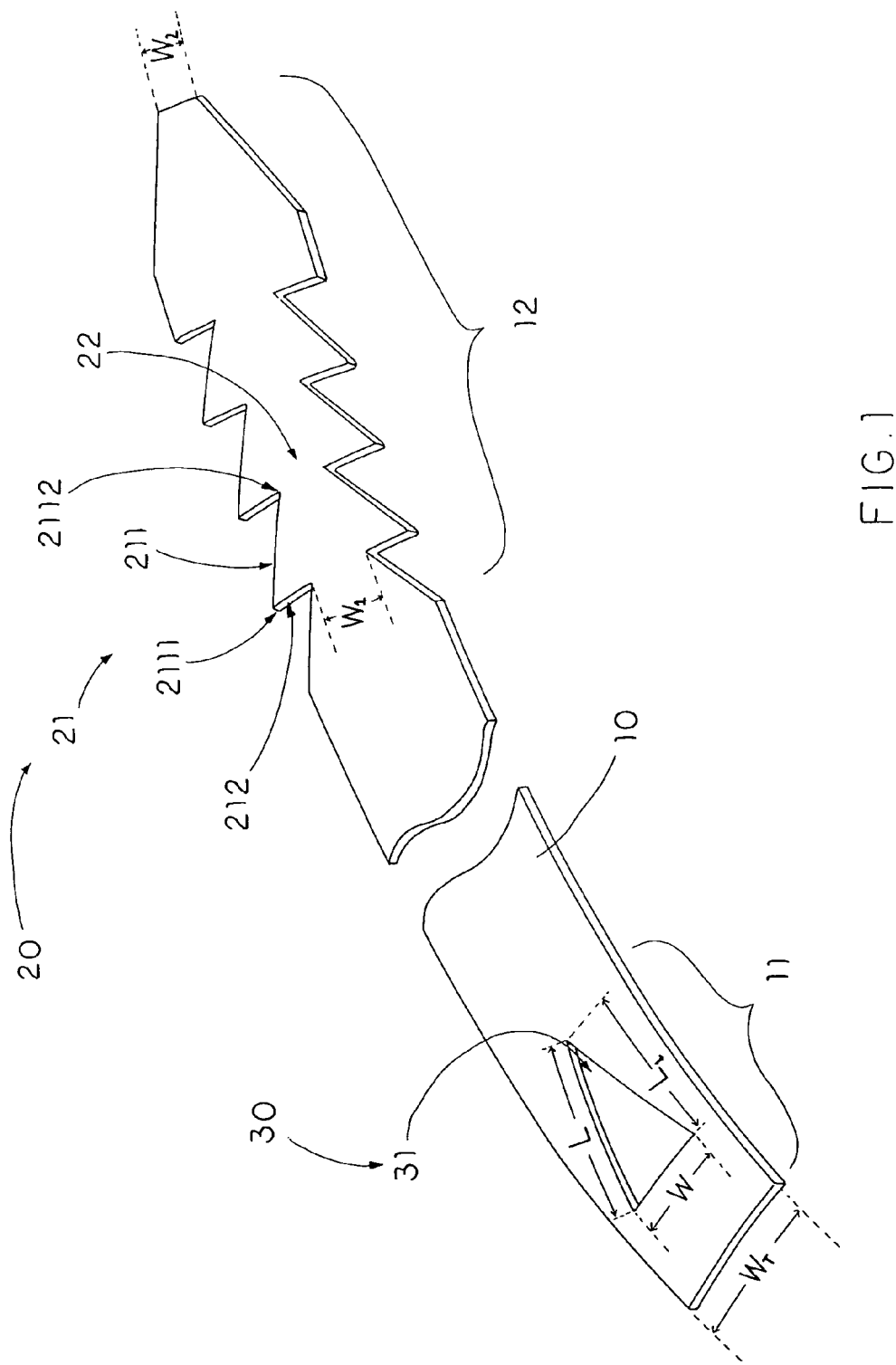
FIG. 1 is a perspective view of an adjustable and detachable binding device according to a first preferred embodiment of the present invention.

Referring to FIGS. 1 and 2 of the drawings, an adjustable and detachable binding device adapted for binding up one or more objects 1 according to a first preferred embodiment of the present invention is illustrated, wherein the adjustable and detachable binding device comprises an elongated binding member 10 having a head end, an opposed tail end, a head portion 11 defining at the head end, and a tail portion 12 defining at the tail end.

A plurality of locking holders 20 are spacedly and integrally formed along the tail portion 12 of the binding member 10. A loop locker 30 is integrally formed at the head portion 11 of the binding member 10 to detachably engage with one of the locking holders 20 to form a binding loop 101 of the binding member 10 for fittingly binding up the object 1, wherein the loop locker 30 is shaped and sized that enables the loop locker 30 to be detachably engaged with the respective locking holder 20, so as to adjust a diameter of the binding loop 101 of the binding member 10 with respect to the object 1.

The binding member 10 is bent between a matting position and a locking position, wherein at the matting position, the loop locker 30 is guided to one of the locking holders 20 so as to selectively adjust the diameter of the binding loop 101, and at the locking position, the loop locker 30 is detachably engaged with the respective locking holder 20 to retain the diameter of the binding loop 101 with respect to the object while the loop locker 30 is allowed to be detached from the respective locking holder 20 when the head portion 11 of the binding member 10 is moved to the matting position.

According to the preferred embodiment, the binding member 10 is an elongated member having a length substantially longer than a diameter of the object 1. The binding member 10 is made of flexible and durable material, such as plastic, adapted to be bent to form the binding loop 101 in a circular shape. The binding member 10 is embodied as an elongated plastic strip which can be manufactured by a conventional plastic molding technique to lower the manufacturing cost of the present invention. Preferably, the binding member 10 is made of polyethylene such as LDPE, HDPE, LLPE, wherein 10% of EVA is optional mixed therewith.

As shown in FIG. 1, the locking holders 20 are respectively embodied as a plurality of locking teeth 21 integrally and alignedly formed along a longitudinal edge of the tail portion 12 of the binding member 10 to define a holding neck portion 22 on the binding member 10 at a root portion of each of the locking teeth 21. The holding neck portion 22 of each of the locking teeth 21 has a width $W_1$ smaller than a width $W_T$ of the binding member 10, wherein the loop locker 30 comprises means for detachably engaging with the holding neck portion 22 of the respective locking tooth 21 to form the binding loop 101.

Each of the locking teeth 21 has a guiding edge 211 having an outer end 2111 formed at the longitudinal edge of the tail portion 12 of the binding member 10 and an inner end 2112 inclinedly and inwardly extended on the binding member 10 towards the tail end thereof to define the holding neck portion 22 on the binding member 10 at the inner end 2112 of the guiding edge 211 of each of the locking teeth 21.

Each of the locking teeth 21 further has a locking edge 212 transversely and inwardly extended from the outer end 2111 of the guiding edge 211 to the inner end 2112 of the adjacent guiding edge 211 such that the locking teeth 21 are continuously extended along the longitudinal edge of the tail portion 12 of the binding member 10.

It is worth to mention that the locking teeth 21 are integrally and alignedly formed along the two longitudinal edges of the tail portion 12 of the binding member 10, as shown in FIG. 1, to enhance the locking ability of the locking holders 20.

Figure 2A:
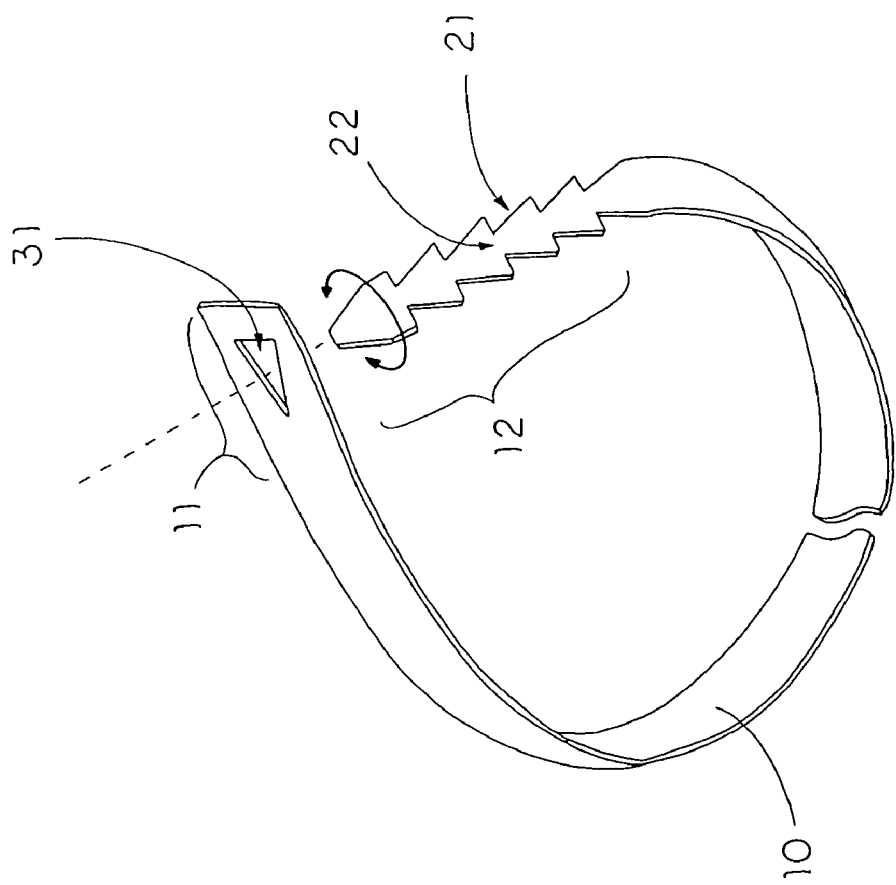
FIGS. 2A and 2B are perspective views of the adjustable and detachable binding device according to the above first preferred embodiment of the present invention, illustrating the binding member forming a binding loop to bind up an object.
Figure 2B:
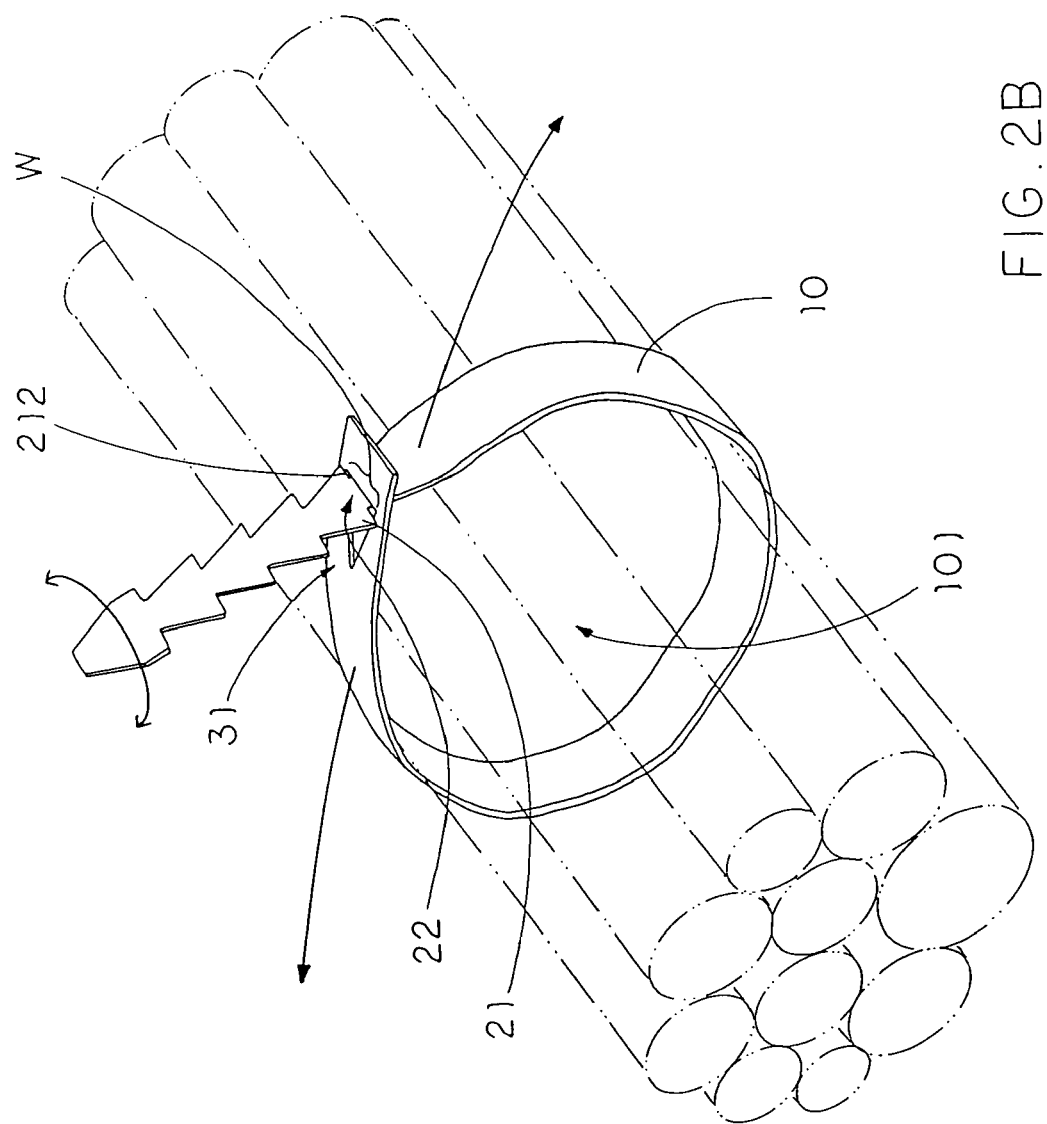

The engaging means of the loop locker 30 contains an elongated locker slot 31 longitudinally formed on the head portion 11 of the binding member 10 wherein the locker slot 31 has a longitudinal length L substantially larger than the width $W_T$ of the binding member 10 and a transverse width W which is larger than a thickness of the binding member 10 and is larger than the width $W_1$ of the holding neck portion 22 of each of the locking teeth 21 in such a manner that when the tail portion 12 of the binding member 10 is twisted to align to the longitudinal length L of the locker slot 31, i.e. the matting position, the tail portion 12 of the binding member 10 is allowed to slidably pass through the locker slot 31, as shown in FIG. 2A, while the tail portion 12 of the binding member 10 is then twisted back to overlap on the head portion 11 thereof to lock up the holding neck portion 22 of the corresponding locking tooth 21 at the locker slot 31 by the transverse width W thereof, i.e. the locking position, so as to form the binding loop 101 of the binding member 10, as shown in FIG. 2B.

In other words, at the matting position, the tail portion 12 of the binding member 10 is twisted to align to the longitudinal length L of the locker slot 31, such that the tail portion 12 of the binding member 10 is allowed to slidably pass through the locker slot 31 so as to adjust the diameter of the binding loop 101. In addition, at the locking position, the tail portion 12 of the binding member 10 is then twisted back to overlap on the head portion 11 thereof to lock up the holding neck portion 22 of the corresponding locking tooth 21 at the locker slot 31 to retain the diameter of the binding loop 101.

It is worth to mention that the guiding edge 211 of each of the locking teeth 21 is extended inclinedly at a direction corresponding to an inserting direction of the tail portion 12 of the binding member 10 such that the locking teeth 21 are allowed to slide through the locker slot 31 at the inserting direction while the locking teeth 21 are blocked up at the transverse width W at an ejecting direction which is opposed to the inserting direction.

Therefore, while sliding the tail portion 12 of the binding member 10 through the locker slot 31 at the inserting direction, the inclined guiding edges 211 of the locking teeth 21 guide the tail portion 12 of the binding member 10 to slide through the locker slot 31 so as to prevent a tearing force applied at the tail portion 12 of the binding member 10 which may tear off the locking teeth 21. In addition, when a pulling force applied on the binding member 10 at the ejecting direction, the locking edge 212 of the respective locking tooth 21 is substantially biased against the head portion 11 of the binding member 10 such that the pulling force can ensure the locking engagement between the locker slot 31 and the respective locking tooth 21, as shown in FIG. 2B.

As shown in FIG. 2B, when the holding neck portion 22 of the locking tooth 21 is locked at the locker slot 31 via the transverse width W thereof, the locking edge 212 of the respective locking tooth 21 biases against the head portion 11 of the binding member 10 at the locker slot 31 so as to further securely lock up the tail portion 12 of the binding member 10 with the head portion 11 thereof to retain the size of the binding loop 101.

As shown in FIG. 1, the locker slot 31 is formed as a triangular shape, wherein the locker slot 31 has a width gradually increasing towards the head end of the binding member 10, so as to substantially guide the twisting movement of the tail portion 12 of the binding member 10 within the locker slot 31. The locker slot 31 has a longitudinal length L substantially larger than the width $W_T$ of the binding member 10 and a transverse width W which is larger than a thickness of the binding member 10 and is larger than the width $W_1$ of the holding neck portion 22 of each of the locking teeth 21.

Accordingly, the longitudinal length L of the locker slot 31 is defined along an adjacent edge thereof for the tail portion 12 of the binding member 10 to slidably inserting therethrough. The locker slot 31 further has a longitudinal guiding width $L_1$ defining at a height of the locker slot 31 at least equal to the width $W_T$ of the binding member 10 so as to enhance the tail portion 12 of the binding member 10 to slidably insert through the locker slot 31, as shown in FIG. 1.

The tail end of the binding member 10 has a tapered shape having a width $W_2$ substantially smaller than the transverse width W of the locker slot 31 such that the tapered tail portion 12 of the binding member 10 is guided to slide through the locker slot 31 when the tail end of the binding member 10 is inserted therethrough. It is worth to mention that when the tapered tail end of the binding member 10 is inserted through the locker slot 31, the user is able to pull the tail end of the binding member 10 to guide the tail portion 12 thereof to slide through the locker slot 31.

In order to operate the adjustable and detachable binding device of the present invention to bind the object 1, the user is able to twist the tail portion 12 of the binding member 10 to align with the longitudinal length L of the locker slot 31, such that the tail portion 12 of the binding member 10 is allowed to slidably pass through the locker slot 31. Then, by applying a pulling force on the tail portion 12 of the binding member 10 at the inserting direction, the tail portion 12 of the binding member 10 is slid through the locker slot 31 to form the binding loop 101. Once the diameter of the binding loop 101 matches the diameter of the object 1, the tail portion 12 of the binding member 10 is then twisted back to its original orientation such that the holding neck portion 22 of the corresponding locking tooth 21 is locked at the locker slot 31 so as to retain the diameter of the binding loop 101 to tightly bind up the object 1. Therefore, the size of the binding loop 101 can be selectively adjusted via the engagement between the locker slot 31 and one of the locking teeth 21 so as to fittingly tight up the object 1 having various sizes.

In order to detach the adjustable and detachable binding device from the object 1, the user is able to move the binding member 10 back to the matting position by twisting the tail portion 12 of the binding member 10 to align with the longitudinal length L of the locker slot 31 so as to release the engagement between the locker slot 31 and the corresponding locking tooth 21. Therefore, the tail portion 12 of the binding member 10 is adapted to slide out from the locker slot 31 to detach the binding member 10 from the object 1.

It is worth to mention that the mention that the adjustable and detachable binding device of the present invention can be reused to re-bind the object 1 by repeating the binding operation. As a result, for example, the user is able to reuse the adjustable and detachable binding device to bind the plant as the object 1 when the plant grows up. Likewise, the adjustable and detachable binding device can be reused to blind the cables as the object 1 when adding or removing the cables without cutting off the original adjustable and detachable binding device.

Figure 2D:
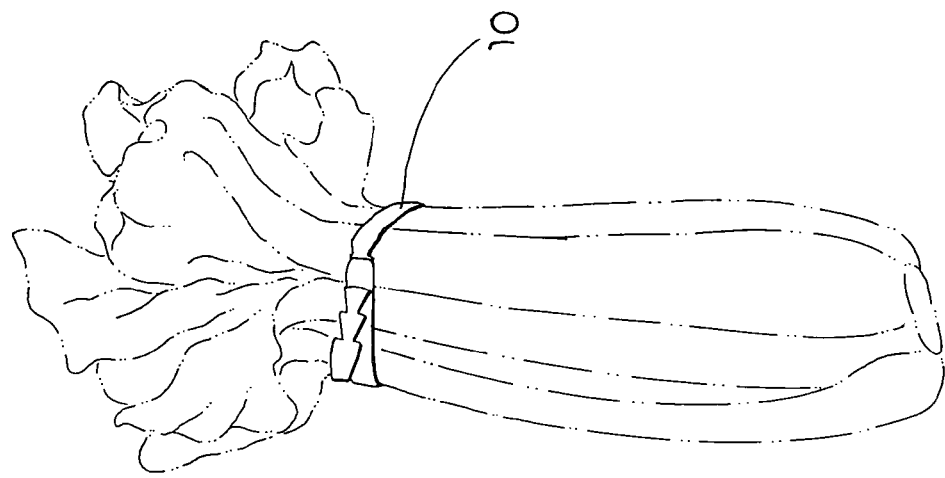
FIGS. 2C, 2D and 2E illustrate the applications of the adjustable and detachable binding device according to the above first preferred embodiment of the present invention.
Figure 2C:
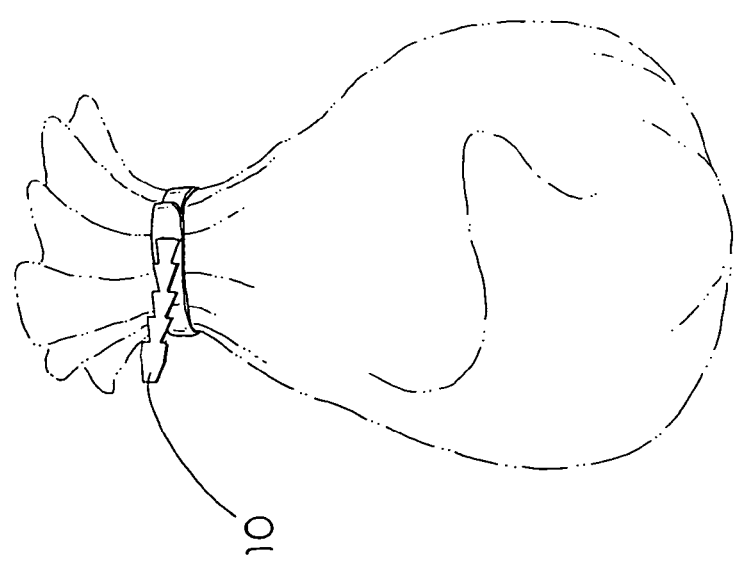
Figure 2E:
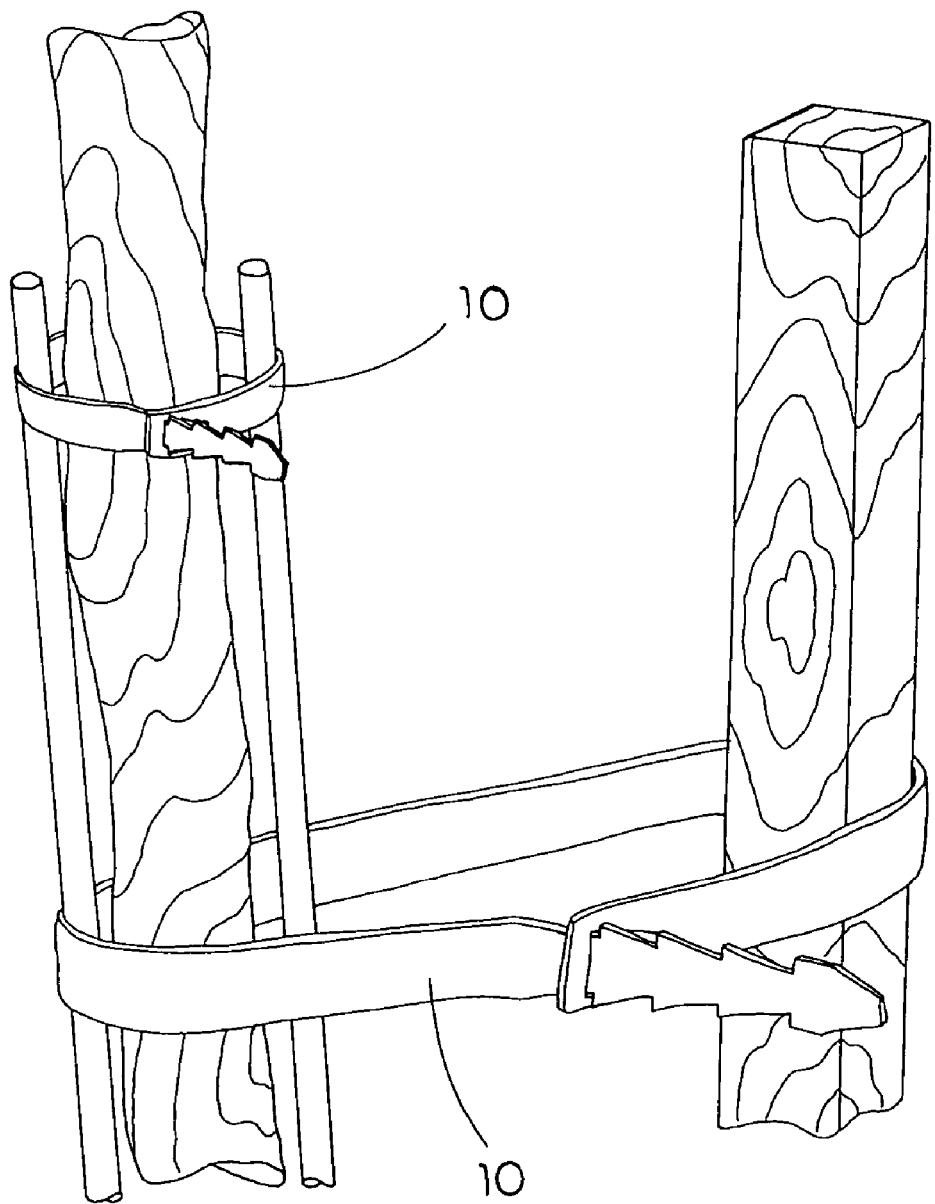

In addition, the adjustable and detachable binding device can be used to bind at an opening of a bag as a bag zipper or bind the vegetable during transportation and storage, as shown in FIGS. 2C and 2D. Thus, the adjustable and detachable binding device is capable of using to bind the growing plant so as to guide the growth of the growing plant stem and branch, as shown in FIG. 2E.

Figure 3:
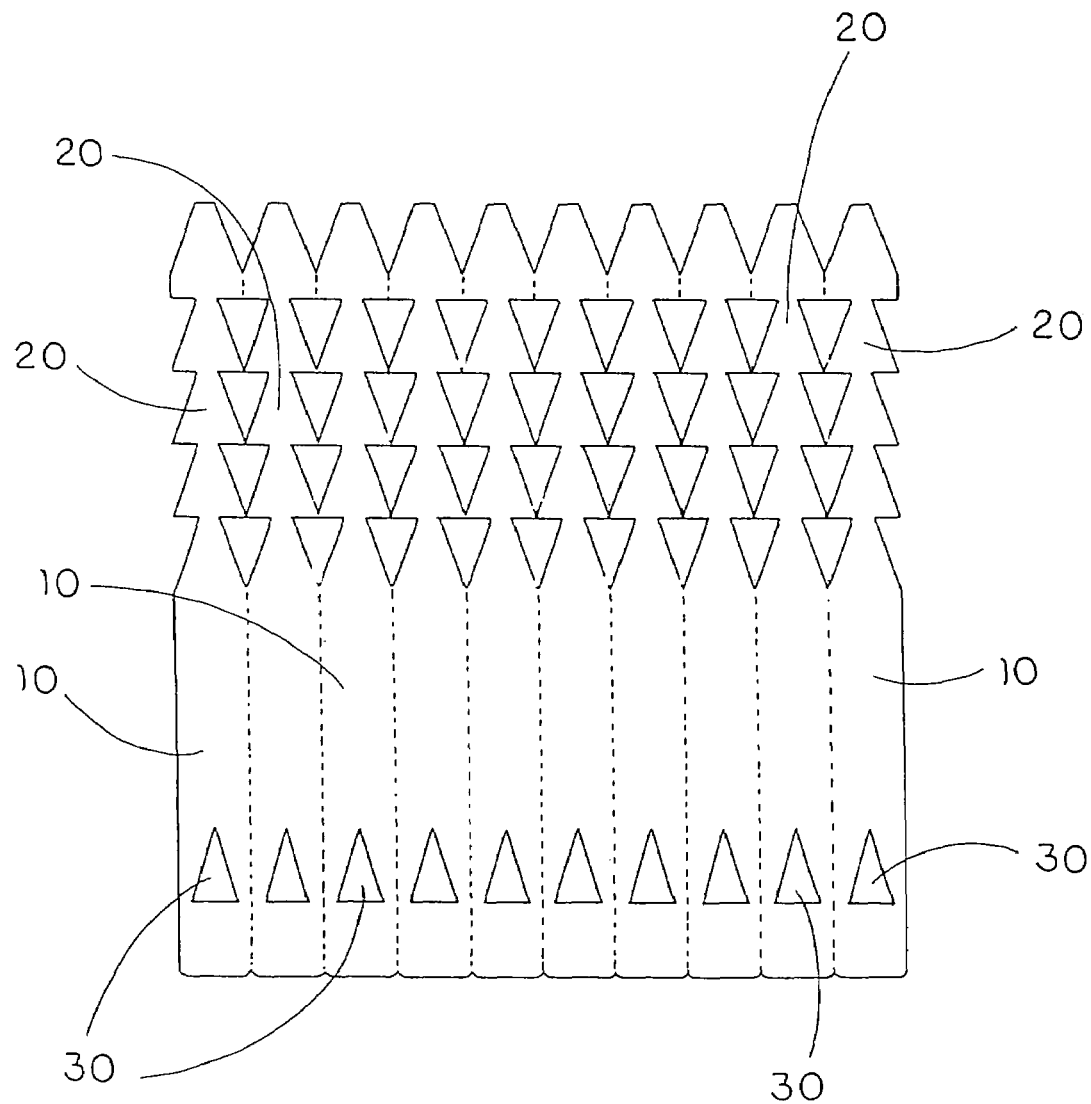
FIG. 3 illustrates the adjustable and detachable binding device being mass-produced according to the above first preferred embodiment of the present invention.

According to the preferred embodiment, the adjustable and detachable binding device of the present invention can be mass production in very low cost. As shown in FIG. 3, the manufacturing process of the adjustable and detachable binding device is simple that by providing a piece of plastic layer and forming a plurality of tearing lines thereon. Therefore, a plurality of adjustable and detachable binding devices are alignedly formed by the plastic layer such that the user is able to easily tear off one of the adjustable and detachable binding devices from the plastic layer for usage.

Figure 4:
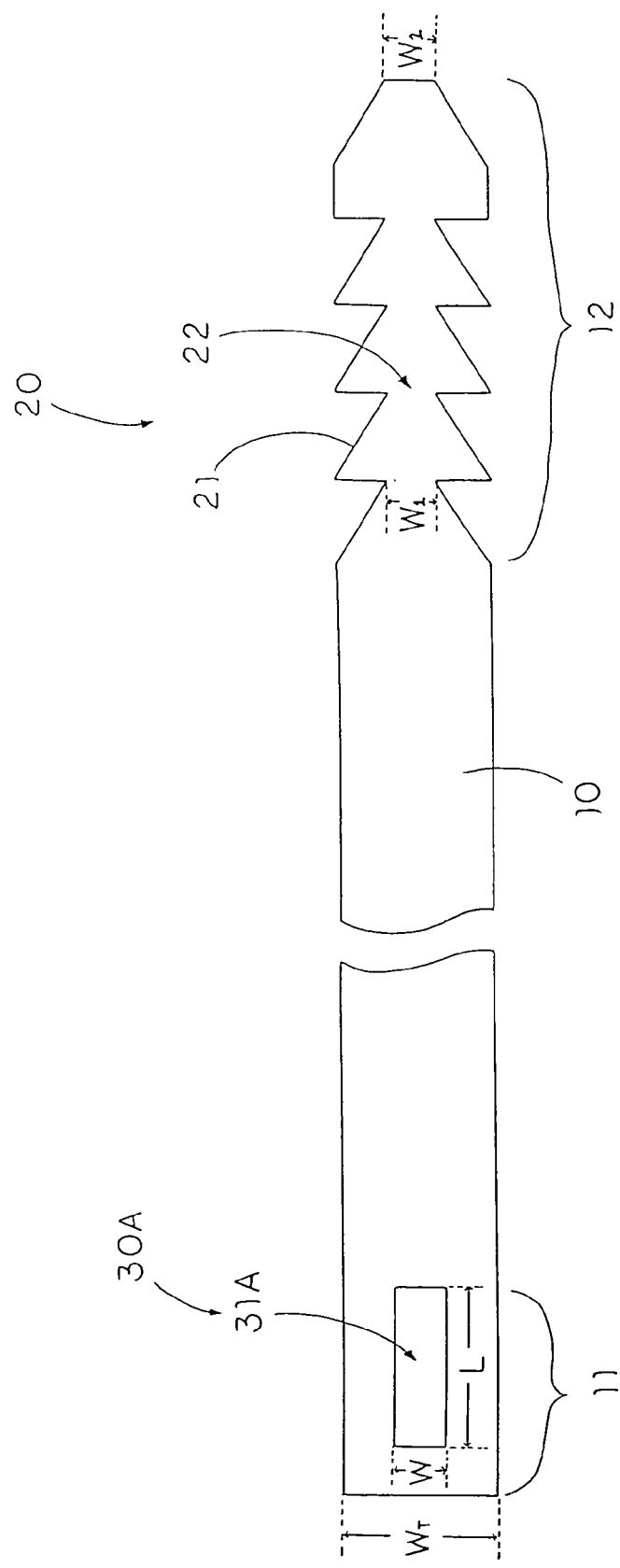
FIG. 4 illustrates a first alternative mode of the adjustable and detachable binding device according to the above first preferred embodiment of the present invention.

FIG. 4 illustrates a first alternative mode of the loop locker 30A which embodies as the locker slot 31A formed as a rectangular shape having an even width, wherein the locker slot 31A has a longitudinal length L substantially larger than a width $W_T$ of the binding member 10 and a transverse width L which is larger than a thickness of the binding member 10 and is larger than a width $W_1$ of the holding neck portion 22 of each of the locking teeth 21. Accordingly, the longitudinal length L of the locker slot 31A is defined at a longitudinal edge thereof and the transverse width L of the locker slot 31A is defined at a transverse edge thereof.

Figure 5:
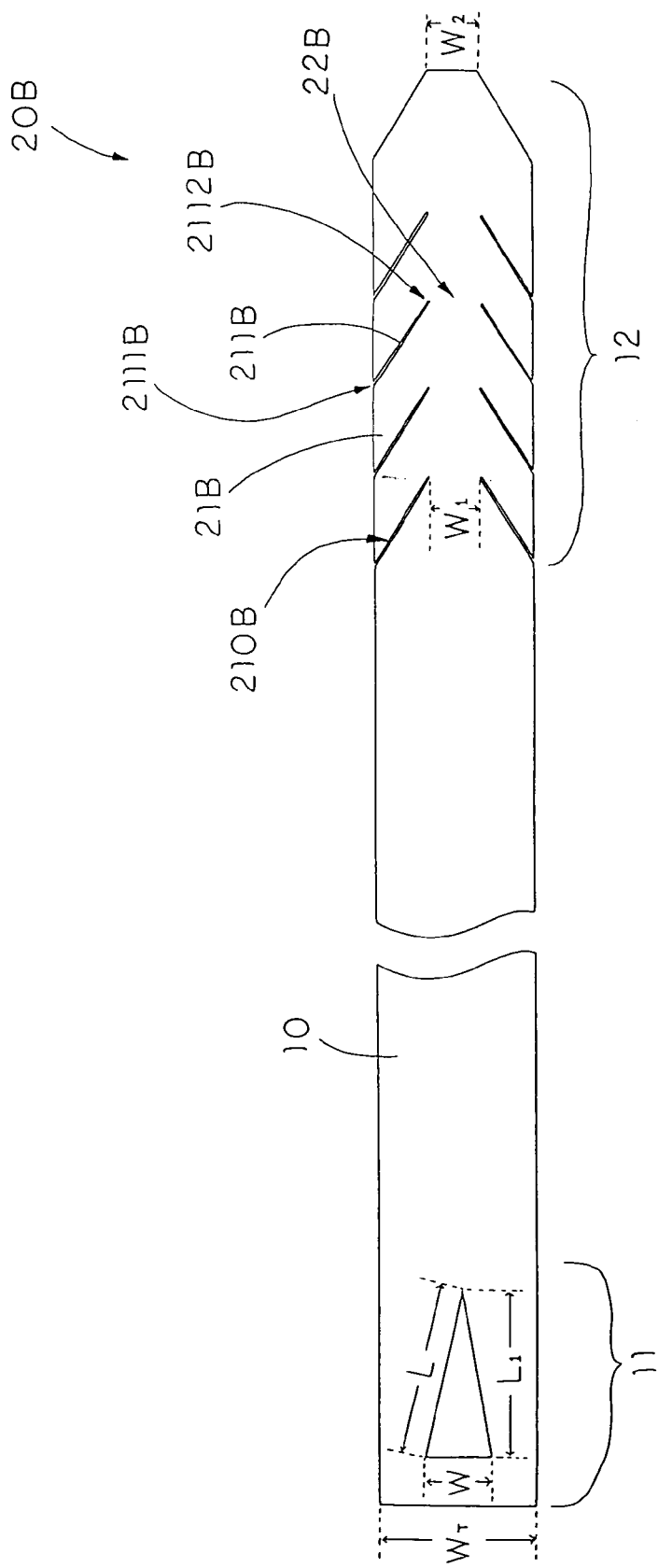
FIG. 5 illustrates a second alternative mode of the adjustable and detachable binding device according to the above first preferred embodiment of the present invention.

FIG. 5 illustrates another alternative mode of the locking holder 20B. Accordingly, each of the locking teeth 21B is formed by an elongated slit 210B inclinedly cut on the tail portion 12 of the binding member 10 from the longitudinal edge thereof wherein each of the locking teeth 21B has a guiding edge 211B having an outer end 2111B formed at the longitudinal edge of the tail portion 12 of the binding member 10 and an inner end 2112B inclinedly and inwardly extended on the binding member 10 towards the tail end thereof to define a holding neck portion 22B on the binding member 10 at the inner end 2112B of the guiding edge 211B of each of the locking teeth 21B. The holding neck portion 22B of each of the locking teeth 21B has a width $W_1$ smaller than a width $W_T$ of the binding member 10.

It is worth to mention that the elongated slits 210B can be evenly formed at two longitudinal edges of the tail portion 12 of the binding member 10 such that the locking teeth 21B are respectively formed along the two longitudinal edges of the tail portion 12 of the binding member 10, as shown in FIG. 5.

Figure 6:
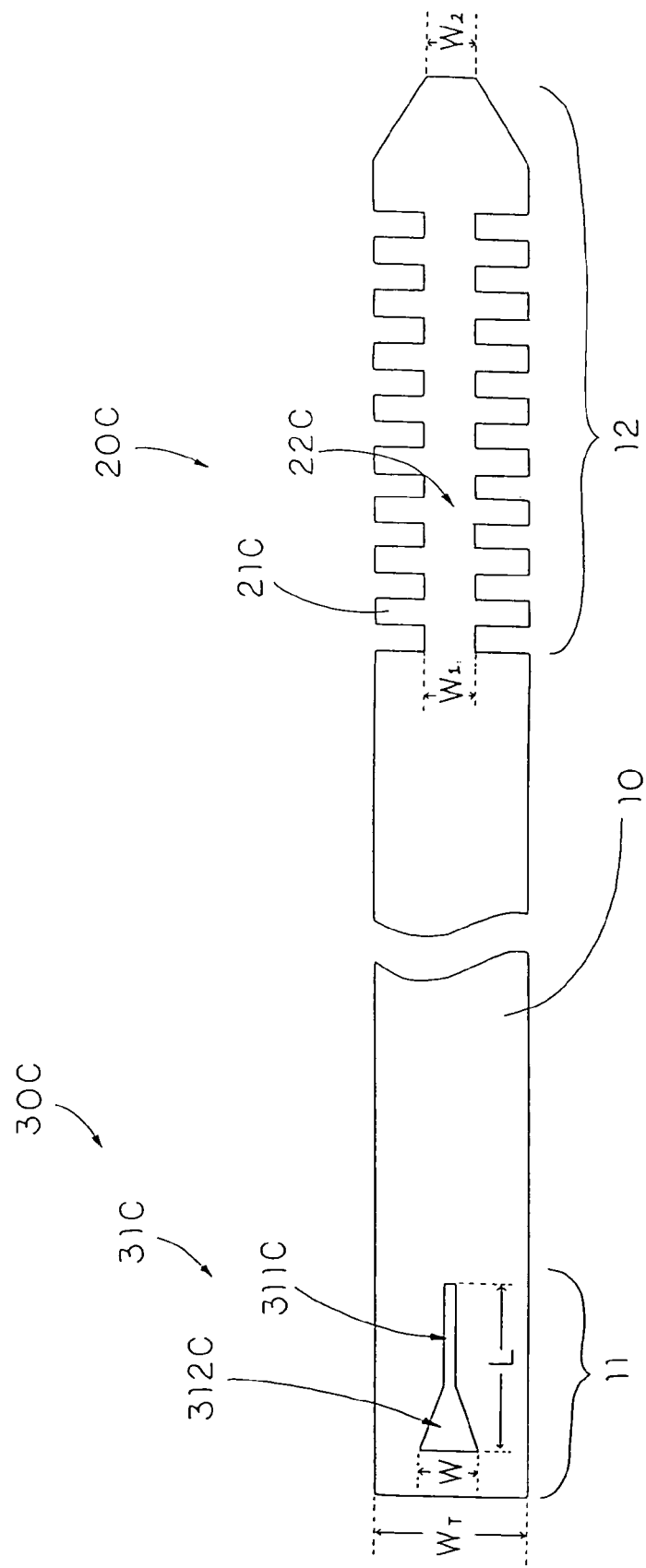
FIG. 6 illustrates a third alternative mode of the adjustable and detachable binding device according to the above first preferred embodiment of the present invention.

FIG. 6 illustrates an alternative mode of the locking holders 20C which are respectively embodied as a plurality of locking teeth 21C integrally and alignedly formed along the longitudinal edge of the tail portion 12 of the binding member 10, wherein the locking teeth 21C, having even thickness, are parallelly extending to the longitudinal edge of the tail portion 12 of the binding member 10 to form as a comb shape so as to define a holding neck portion 22C on the binding member 10 at a root portion of each of the locking teeth 21C, wherein the holding neck portion 22C of each of the locking teeth 21C has a width $W_1$ smaller than a width $W_T$ of the binding member 10.

Therefore, while the tail portion 12 of the binding member 10 is twisted back to overlap on the head portion 11 thereof, the holding neck portion 22C of the corresponding locking tooth 21C is locked up at the locker slot 31C by the transverse width W thereof, so as to form the binding loop 101 of the binding member 10. In addition, locking teeth 21C are integrally and alignedly formed along the two longitudinal edges of the tail portion 12 of the binding member 10, as shown in FIG. 6, to enhance the locking ability of the locking holders 20C.

As shown in FIG. 6, the locker slot 31C has a longitudinal engaging portion 311C having a width larger than the thickness of the binding member 10 and a longitudinal locking portion 312C integrally extended from the engaging portion 311C towards the head end of the binding member 10, wherein the locking portion 312C has a width gradually increasing from the engaging portion 312C in such a manner that when the respective locking tooth 21C is locked at the locker slot 31C after the tail portion 12 of the binding member 10 is slid through the locker slot 31C, the holding neck portion 22C of the respective locking tooth 21C is retained at the locking portion 312C of the locker slot 31C.

It is worth to mention that the engaging portion 311C of the locker slot 31C ensures the alignment of the tail portion 12 of the binding member 10 with the longitudinal length L of the locker slot 31C while the locking portion 312C of the locker slot 31C restricts the twisting movement of the tail portion 12 of the binding member 10 within the locker slot 31C to complete the locking operation of the loop locker 30C to one of the locking holders 20C.

It is worth to mention that the alternative modes of the locker holders 20, 20B, 20C and the loop locker 30, 30A, 30C, as shown in FIGS. 1 through 6, can be interchanged to detachably engage the loop locker 30, 30A, 30C with one of the locker holders 20, 20B, 20C by the corresponding dimensions. That is, the locker slot 31 has a longitudinal length L substantially larger than a width $W_T$ of the binding member 10 and a transverse width L which is larger than a thickness of the binding member 10 and is larger than the width $W_1$ of the holding neck portion 22 of each of the locking teeth 21.

Figure 7:
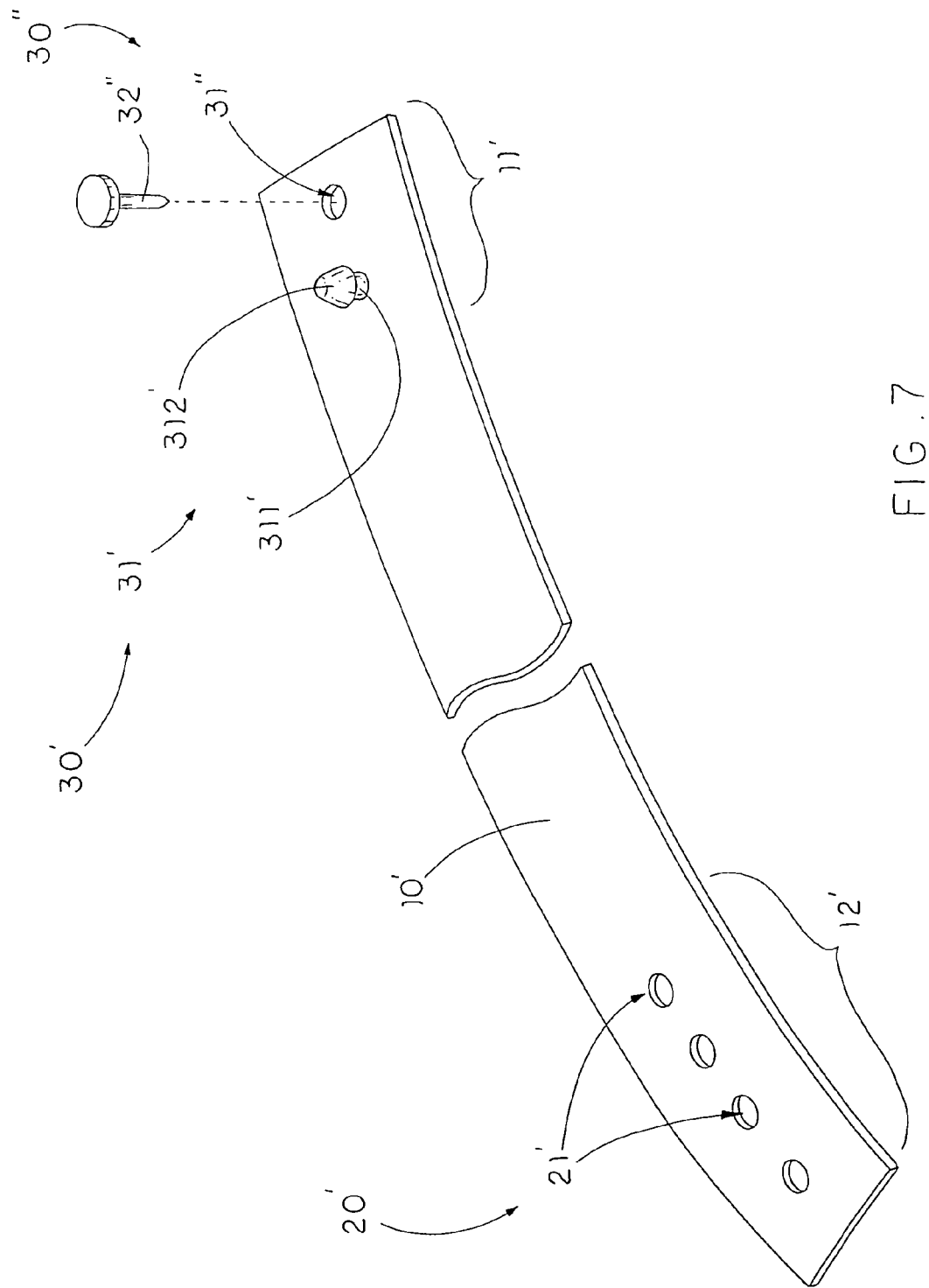
FIG. 7 is a perspective view of an adjustable and detachable binding device according to a second preferred embodiment of the present invention.
Figure 8:
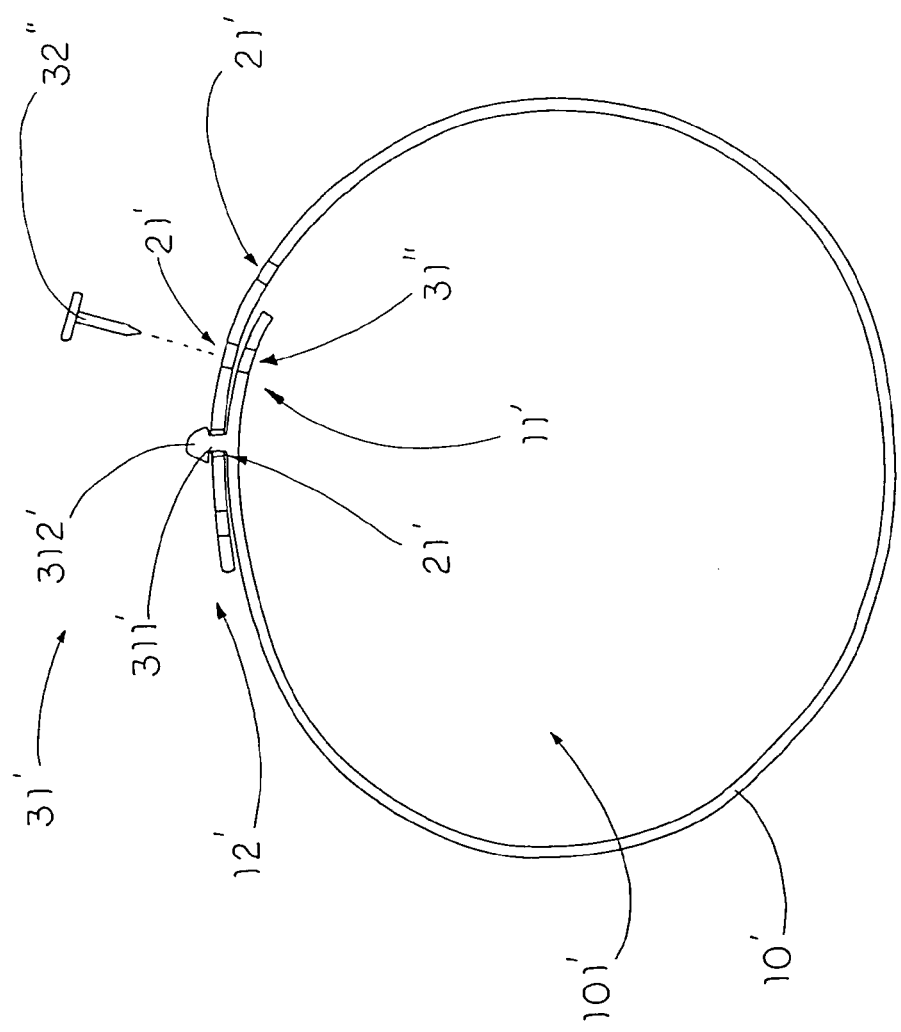
FIG. 8 illustrates a first alternative mode of the adjustable and detachable binding device according to the above second preferred embodiment of the present invention, illustrating the binding member forming a binding loop to bind up an object.

As shown in FIGS. 7 and 8, an adjustable and detachable binding device of a second embodiment illustrates an alternative mode of the first embodiment of the present invention, wherein the adjustable and detachable binding device comprises an elongated binding member 10' having a head end, an opposed tail end, a head portion 11' defining at the head end, and a tail portion 12' defining at the tail end.

The adjustable and detachable binding device further comprises a plurality of locking holders 20' spacedly and integrally formed along the tail portion 12' of the binding member 10', and a loop locker 30' integrally formed at the head portion 11 of the binding member 10' to detachably engage with one of the locking holders 20' to form a binding loop 101' of the binding member 10' for fittingly binding up the object 1, wherein the loop locker 30' is shaped and sized that enables the loop locker 30' to be detachably engaged with the respective locking holder 20', so as to adjust a diameter of the binding loop 101' of the binding member 10' with respect to the object 1, as shown in FIG. 8.

According to the preferred embodiment, the locking holders 20' are respectively embodied as a plurality of locking holes 21' spacedly and alignedly formed between two longitudinal edges of the tail portion 12' of the binding member 10', wherein each of the locking holes 21', having a predetermined diameter, is adapted to be deformed to slightly increase the diameter thereof.

The loop locker 30' comprises a locker member 31' detachably inserted into one of the locking holes 21' to form the binding loop 101' wherein the locker member 31' has a narrowed neck portion 311' integrally protruded from the head portion 11' of the binding member 10' and an enlarged inserting head 312' which is integrally extended from the narrowed neck portion 311' and has a diameter substantially larger than a diameter of the narrowed neck portion 311'. Each of the locking holes 21' has the diameter substantially larger than the diameter of the narrowed neck portion 311' and slightly smaller than the diameter of inserting head 312' in such a manner that when the locker member 31' is detachably inserted into one of the locking holes 21', the respective locking hole 21' is slightly deformed to allow the inserting head 312' to pass therethrough while the narrowed neck portion 311' of the locker member 31' is locked at the respective locking hole 21' so as to retain the binding loop 101' of the binding member 10'.

According to the second embodiment, the inserting head 312' of the locker member 31' has a tapered shape having a diameter substantially reducing towards a free end thereof so as to enhance the inserting head 312' to slidably insert into the respective locking hole 21'.

In order to operate the adjustable and detachable binding device, the user is able to bend the tail portion 12' of the binding member 10' towards the head portion 11' thereof to fold the binding member 10' to the matting position that the free end of the inserting head 312' is concentrically aligned with one of the locking holes 21' to adjustably form the binding loop 101' corresponding to the object 1. Once the size of the binding loop 101' matches the size of the object 1, the binding member 10' is moved to the locking position that the locker member 31' is slidably inserted into the respective locking hole 21' until the inserting head 312' passes through the locking hole 21' by applying an inserting force on the locker member 31' so as to retain the diameter of the binding loop 101' for binding the object 1.

It is worth to mention that the mention that the adjustable and detachable binding device of the present invention can be reused to re-bind the object 1 when the binding member 10' is moved back to the matting position by applying a pulling force on the tail portion 12' of the binding member 10' to pull the inserting head 312' of the locker member 31' sliding out from the respective locking hole 21' and repeating the binding operation as mentioned above.

Alternatively, the loop locker 30" contains at least a retaining hole 31" formed at the head portion 11' of the binding member 10' wherein the tail portion 12' of the binding member 10' is folded to overlap with the head portion 11' thereof to align the retaining hole 31" with one of the locking hole 21' so as to adjust the size of the binding loop 101' of the binding member 10'. Therefore, a hole locker 32" is used to slidably pass the retaining hole 31" through the respective locking hole 21' to lock up the head portion 11' of the binding member 10' with the tail portion 12' thereof so as to retain the binding loop 101' of the binding member 10' with respect to the object 1'. Accordingly, the hole locker 32" can be a pin or a rivet detachably inserted into the retaining hole 31" through the respective locking hole 21' to retain the size of the binding loop 101' of the binding member 10'.

Figure 9:
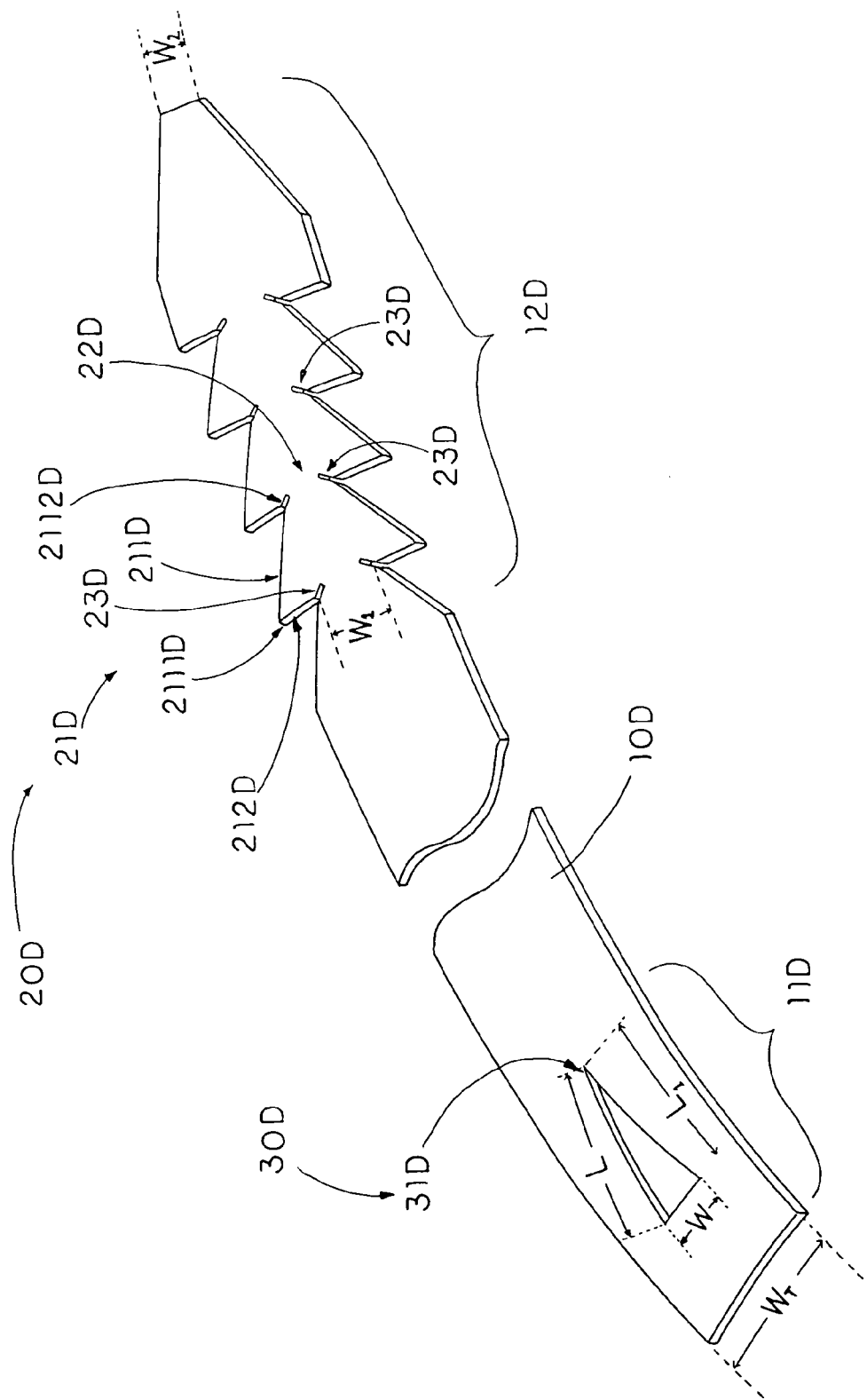
FIG. 9 is a perspective view of an adjustable and detachable binding device according to a third preferred embodiment of the present invention.

As shown in FIG. 9, an adjustable and detachable binding device of a third embodiment illustrates another alternative mode of the first embodiment of the present invention, wherein the adjustable and detachable binding device comprises an elongated binding member 10D having a head end, an opposed tail end, a head portion 11D defining at the head end, and a tail portion 12D defining at the tail end. The binding member 10D is an elongated member having a length substantially longer than a diameter of the object. The binding member 10D is made of flexible and durable material, such as plastic, adapted to be bent to form a binding loop 101D in a circular shape. The binding member 10D is embodied as an elongated plastic strip which can be manufactured by a conventional plastic molding technique to lower the manufacturing cost of the present invention. Preferably, the binding member 10D is made of polyethylene such as LDPE, HDPE, LLPE, wherein 10% of EVA is optional mixed therewith.

A plurality of locking holders 20D are spacedly and integrally formed along the tail portion 12D of the binding member 10D. A loop locker 30D is integrally formed at the head portion 11D of the binding member 10D to detachably engage with one of the locking holders 20D to form the binding loop 10D of the binding member 10D for fittingly binding up the object, wherein the loop locker 30D is shaped and sized that enables the loop locker 30D to be detachably engaged with the respective locking holder 20D, so as to adjust a diameter of the binding loop 101D of the binding member 10D with respect to the object.

The locking holders 20D are respectively a plurality of locking teeth 21D integrally and alignedly formed along a longitudinal edge of the tail portion 12D of the binding member 10D to define a holding neck portion 22D on the binding member 10D at a root portion of each of the locking teeth 21D. The holding neck portion 22D of each of the locking teeth 21D has a width $W_1$ smaller than a width $W_T$ of the binding member 10D, wherein the loop locker 30D comprises means for detachably engaging with the holding neck portion 22D of the respective locking tooth 21D to form the binding loop 101D.

Each of the locking teeth 21D has a guiding edge 211D having an outer end 2111D formed at the longitudinal edge of the tail portion 12D of the binding member 10D and an inner end 2112D inclinedly and inwardly extended on the binding member 10D towards the tail end thereof to define the holding neck portion 22D on the binding member 10D at the inner end 2112D of the guiding edge 211D of each of the locking teeth 21D.

Each of the locking teeth 21D further has a locking edge 212D transversely and inwardly extended from the outer end 2111D of the guiding edge 211D to the inner end 2112D of the adjacent guiding edge 211D such that the locking teeth 21D are continuously extended along the longitudinal edge of the tail portion 12D of the binding member 10D. Accordingly, the locking teeth 21D are integrally and alignedly formed along the two longitudinal edges of the tail portion 12D of the binding member 10D to enhance the locking ability of the locking holders 20D. Preferably, an angle between the guiding edge 211D and the locking edge 212D of each of the locking teeth 21D is less than 90 degree.

The engaging means of the loop locker 30D contains an elongated locker slot 31D longitudinally formed on the head portion 11D of the binding member 10D wherein the locker slot 31D has a longitudinal length L substantially larger than the width $W_T$ of the binding member 10D and a transverse width W which is larger than a thickness of the binding member 10D and is larger than the width $W_1$ of the holding neck portion 22D of each of the locking teeth 21D in such a manner that when the tail portion 12D of the binding member 10D is twisted to align to the longitudinal length L of the locker slot 31D, i.e. the matting position, the tail portion 12D of the binding member 10D is allowed to slidably pass through the locker slot 31D while the tail portion 12D of the binding member 10D is then twisted back to overlap on the head portion 11D thereof to lock up the holding neck portion 22D of the corresponding locking tooth 21D at the locker slot 31D by the transverse width W thereof, i.e. the locking position, so as to form the binding loop 101D of the binding member 10D.

Figure 10:
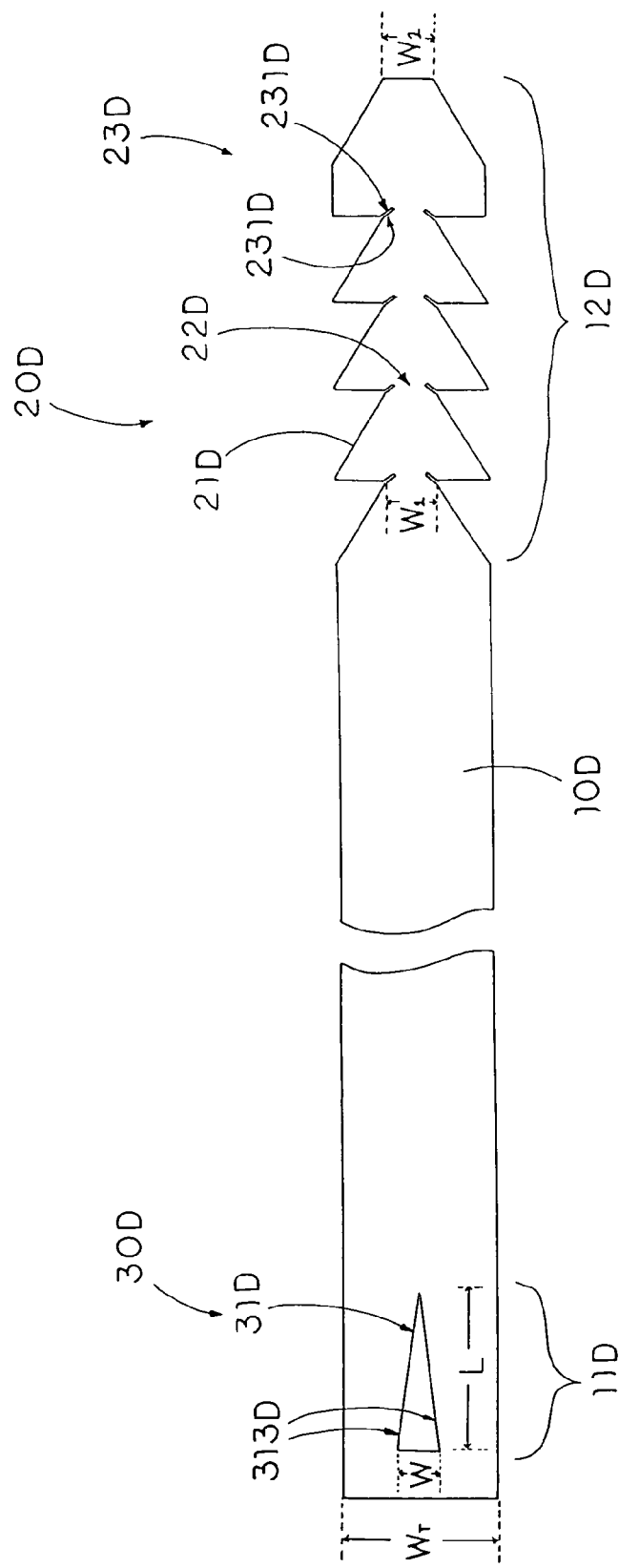
FIG. 10 is a top view of the adjustable and detachable binding device according to the above third preferred embodiment of the present invention.

As shown in FIGS. 9 and 10, the locker slot 31D is formed as a triangular shape, wherein the locker slot 31D has a width gradually increasing towards the head end of the binding member 10D, so as to substantially guide the twisting movement of the tail portion 12D of the binding member 10D within the locker slot 31D. The locker slot 31D has a longitudinal length L substantially larger than the width $W_T$ of the binding member 10D and a transverse width W which is larger than a thickness of the binding member 10D and is smaller than the width $W_1$ of the holding neck portion 22D of each of the locking teeth 21D. The locker slot 31D further has two longitudinal edges 313D defining at the adjacent edge thereof. In other words, the distance between the two longitudinal edges 313D is gradually reducing towards the tail end of the binding member 10D.

Figure 11:
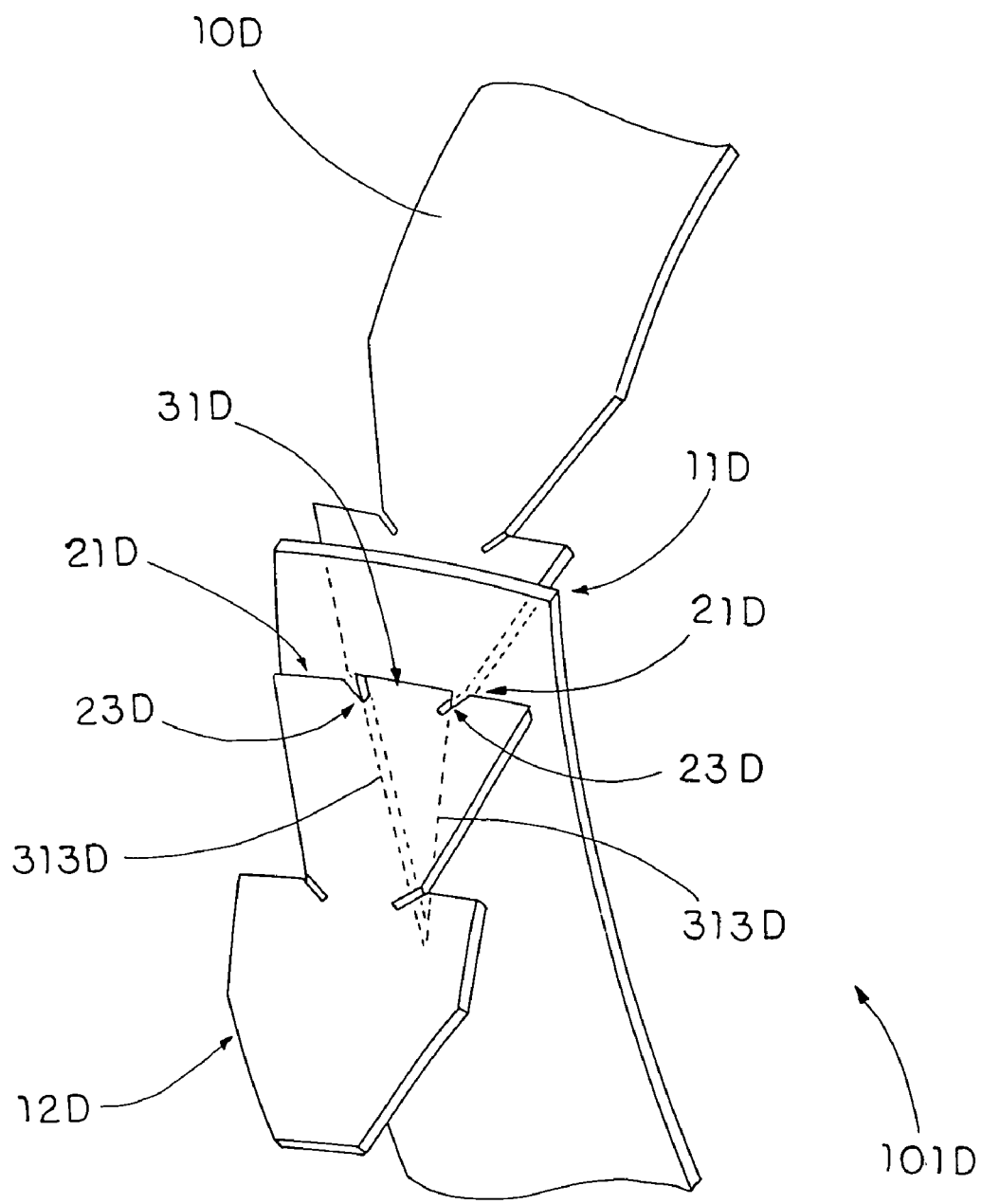
FIG. 11 is a perspective view of the adjustable and detachable binding device according to the above third preferred embodiment of the present invention, illustrating the head portion of binding member being engaged with the tail portion thereof.

Accordingly, the longitudinal length L of the locker slot 31 is defined along the adjacent edge (i.e. the longitudinal edge 313D) thereof for the tail portion 12D of the binding member 10 to slidably inserting therethrough. The locker slot 31D further has a longitudinal guiding width $L_1$ defining at a height of the locker slot 31D slightly smaller than the width $W_T$ of the binding member 10D such that the tail portion 12D of the binding member 10D must be twisted to align with the adjacent edge of the triangular locker slot 31D in order to slidably pass therethrough, as shown in FIG. 11.

In other words, at the matting position, the tail portion 12D of the binding member 10D is twisted to align to the longitudinal length L of the locker slot 31D, such that the tail portion 12D of the binding member 10 is allowed to slidably pass through the locker slot 31D so as to adjust the diameter of the binding loop 10D. In addition, at the locking position, the tail portion 12D of the binding member 10D is then twisted back to overlap on the head portion 11D thereof to lock up the holding neck portion 22D of the corresponding locking tooth 21D at the locker slot 31D to retain the diameter of the binding loop 101D.

It is worth to mention that the guiding edge 211D of each of the locking teeth 21D is extended inclinedly at a direction corresponding to an inserting direction of the tail portion 12D of the binding member 10D such that the locking teeth 21D are allowed to slide through the locker slot 31D at the inserting direction while the locking teeth 21D are blocked up at the transverse width W at an ejecting direction which is opposed to the inserting direction.

As shown in FIG. 10, each of the locking teeth 21D further has a locking slit 23D inwardly extended from the inner end 2112D of the respective locking teeth 21D at the holding neck portion 22D thereof. Each of the locking slits 23D has two slit edges 231D parallelly extending at the holding neck portion 22D on the binding member 10D to engage with the respective longitudinal edge 313D of the locker slot 31D. In other words, one of the slit edges 231D of the locking tooth 21D is extended from the guiding edge 211D of the corresponding locking tooth 21D while another slit edge 231D of the locking tooth 21D is extended from the locking edge 212D of the respective locking tooth 21D. Preferably, a distance between the slit edges 231D of each of the locking teeth 21D (i.e. the width of the locking slit 23D) is slightly larger than a thickness of the binding member 10D. Therefore, when the respective locking tooth 21D is engaged with the locker slot 31D, the longitudinal edges 313D of the locker slot 31D are substantially engaged with the respective locking slits 23D between the slit edges 231D so as to lock up the head portion 11D of the binding member 10D with the tail portion 12D thereof to form the binding loop 101D.

Accordingly, a plurality of cuts are inclinedly formed at the inner ends 2112D of the locking teeth 21D to form the locking slits 23D at the holding neck portion 22D respectively, wherein the two slit edges 231D of each of the locking slits 23D are parallelly extended at the respective holding neck portion 22D to have a uniform width between the two slit edges 231D. In other words, the locking slits 23D are inclinedly extended at inserting direction of the tail portion 12D of the binding member 10D. It is worth to mention that the locking slits 23D can be inclinedly extended to align with the guiding edges 211D of the locking teeth 21D. Preferably, the locking slits 23D are inclinedly extended not to align with the guiding edges 211D of the locking teeth 21D as shown in FIG. 10. In other words, an opening of each of the locking slits 23D is formed at the inner end of the respective locking tooth 21D.

Therefore, while sliding the tail portion 12D of the binding member 10D through the locker slot 31D at the inserting direction, the inclined guiding edges 211D of the locking teeth 21D guide the tail portion 12D of the binding member 10D to slide through the locker slot 31D so as to prevent a tearing force applied at the tail portion 12D of the binding member 10D which may tear off the locking teeth 21D. In addition, when a pulling force applied on the binding member 10D at the ejecting direction, the locking edge 212D of the respective locking tooth 21D is substantially biased against the head portion 11D of the binding member 10D such that the pulling force can ensure the locking engagement between the locker slot 31D and the respective locking tooth 21D.

When the holding neck portion 22D of the locking tooth 21D is locked at the locker slot 31D via the transverse width W thereof, the locking edge 212D of the respective locking tooth 21D biases against the head portion 11 of the binding member 10D at the locker slot 31D so as to further securely lock up the tail portion 12D of the binding member 10D with the head portion 11D thereof to retain the size of the binding loop 110D.

The tail end of the binding member 10D has a tapered shape having a width $W_2$ substantially smaller than the transverse width W of the locker slot 31D such that the tapered tail portion 12D of the binding member 10D is guided to slide through the locker slot 31D when the tail end of the binding member 10D is inserted therethrough. It is worth to mention that when the tapered tail end of the binding member 10D is inserted through the locker slot 31D, the user is able to pull the tail end of the binding member 10D to guide the tail portion 12D thereof to slide through the locker slot 31D.

In order to operate the adjustable and detachable binding device of the present invention to bind the object, the user is able to twist the tail portion 12D of the binding member 10D to align with the longitudinal length L of the locker slot 31D, such that the tail portion 12D of the binding member 10D is allowed to slidably pass through the locker slot 31D. Then, by applying a pulling force on the tail portion 12D of the binding member 10D at the inserting direction, the tail portion 12D of the binding member 10D is slid through the locker slot 31D to form the binding loop 101D. Once the diameter of the binding loop 101D matches the diameter of the object, the tail portion 12D of the binding member 10D is then twisted back to its original orientation such that the two longitudinal edges 313D of the locker slot 31D are locked at the two opposed neighboring locking slits 23D at the corresponding holding neck portion 22D of the corresponding locking tooth 21D, as shown in FIG. 11, so as to retain the diameter of the binding loop 101D to tightly bind up the object. Therefore, the size of the binding loop 101D can be selectively adjusted via the engagement between the locker slot 31D and one of the locking teeth 21D so as to fittingly tight up the object having various sizes.

It is worth to mention that since the two longitudinal edges 313D of the locker slot 31D are locked at the two opposed neighboring locking slits 23D, the head portion 11D of the binding member 10D is securely engaged with the tail portion 12D thereof via the locker slot 31D and the locking teeth 21D, so as to substantially retain the binding loop 101D of the binding member 10D. Once the two longitudinal edges 313D of the locker slot 31D are locked at the two opposed neighboring locking slits 23D, the head portion 11D of the binding member 10D cannot be accidentally disengaged with the corresponding locking teeth 21D so as to prevent the tail portion 12D of the binding member 10D from being slid out of the locker slot 31D.

In order to detach the adjustable and detachable binding device from the object, the user is able to move the binding member 10D back to the matting position by twisting the tail portion 12D of the binding member 10D to align with the longitudinal length L of the locker slot 31D so as to release the engagement between the locker slot 31D and the corresponding locking tooth 21D. Therefore, the tail portion 12D of the binding member 10D is adapted to slide out from the locker slot 31D to detach the binding member 10D from the object.

It is worth to mention that the mention that the adjustable and detachable binding device of the present invention can be reused to re-bind the object by repeating the binding operation. As a result, for example, the user is able to reuse the adjustable and detachable binding device to bind the plant as the object when the plant grows up. Likewise, the adjustable and detachable binding device can be reused to blind the cables as the object when adding or removing the cables without cutting off the original adjustable and detachable binding device.

Figure 12A:
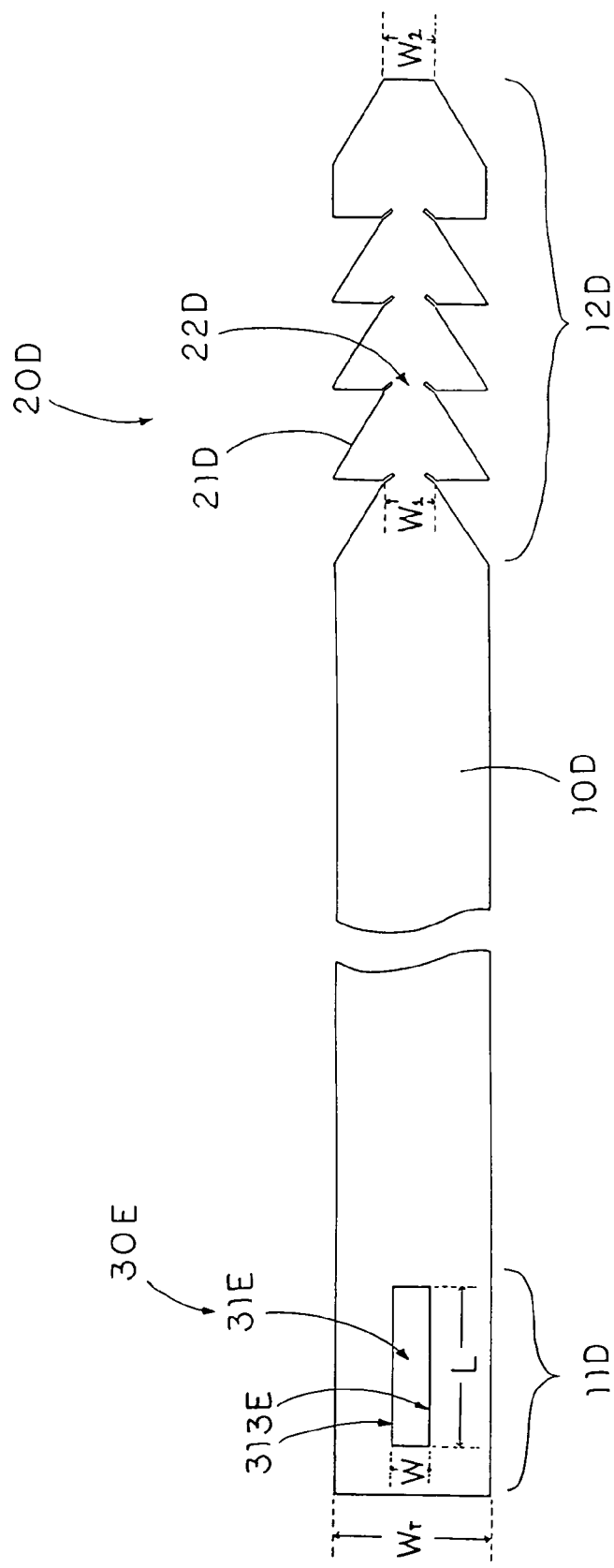
FIGS. 12A and 12B illustrate an alternative mode of the locker slot of the adjustable and detachable binding device according to the above third preferred embodiment of the present invention.
Figure 12B:
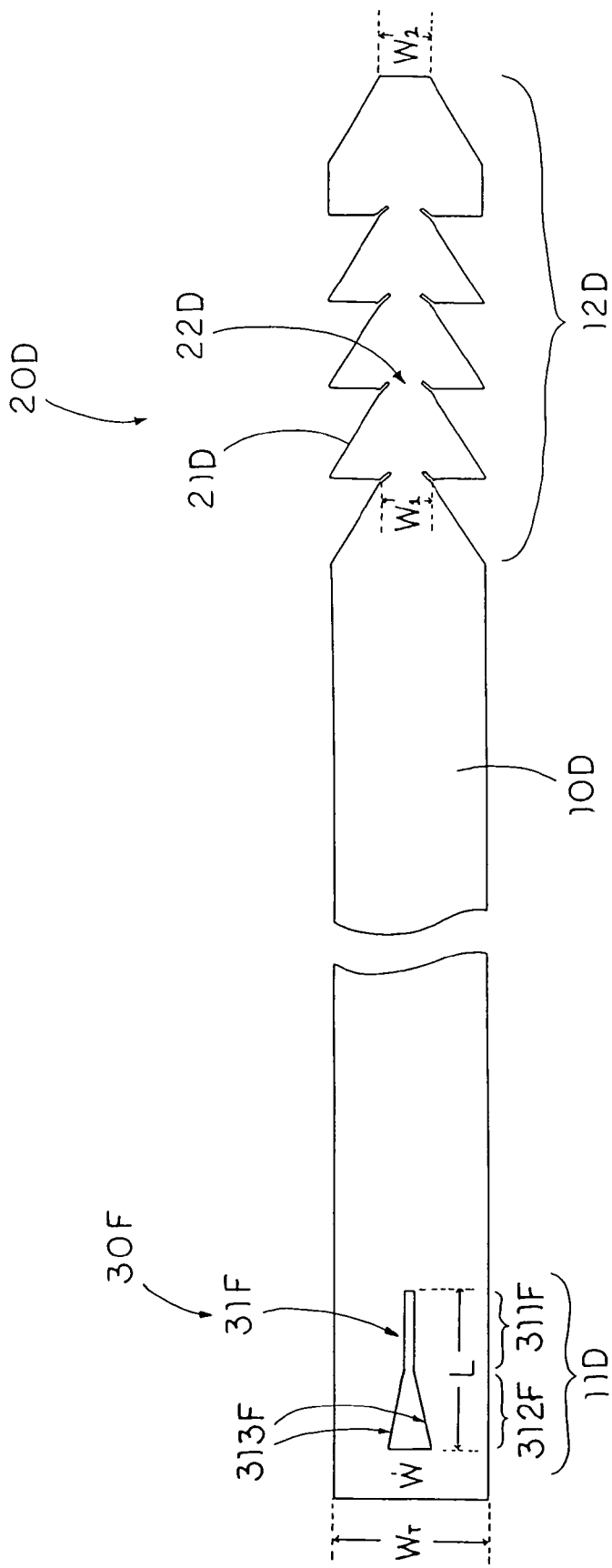

FIGS. 12A to 12B illustrate the alternative mode of the locker slot 31E, 31F of the loop locker 30E, 30F to illustrate different profiles of the loop locker 30E, 30F.

As shown in FIG. 12A, the locker slot 31E of the loop locker 30E has a rectangular shape having an even width, wherein the locker slot 31E has a longitudinal length L substantially larger than a width $W_T$ of the binding member 10D and a transverse width L which is larger than a thickness of the binding member 10D and is larger than a width $W_1$ of the holding neck portion 22D of each of the locking teeth 21D. Accordingly, the longitudinal length L of the locker slot 31E is defined at a longitudinal edge 313E thereof and the transverse width W of the locker slot 31E is defined at a transverse edge thereof. In addition, the width $W_1$ of the holding neck portion 22D of each of the locking teeth 21D is larger than the transverse width W of the locker slot 31E. Therefore, the two longitudinal edges 313E of the locker slot 31E are locked at the two opposed neighboring locking slits 23D to securely engage the head portion 11D of the binding member 10D with the tail portion 12D thereof.

As shown in FIG. 12B, the locker slot 31F of the loop locker 30F has a longitudinal engaging portion 311F having an even width larger than the thickness of the binding member 10 and a longitudinal locking portion 312F integrally extended from the engaging portion 311F towards the head end of the binding member 10D, wherein the locking portion 312F has a width gradually increasing from the engaging portion 312F in such a manner that when the respective locking tooth 21D is locked at the locker slot 31F after the tail portion 12D of the binding member 10D is slid through the locker slot 31F, the holding neck portion 22D of the respective locking tooth 21D is retained at the locking portion 312F of the locker slot 31F. Accordingly, the width $W_1$ of the holding neck portion 22D of each of the locking teeth 21D is larger than the transverse width W of the locking portion 312F of the locker slot 31E. Therefore, the two longitudinal edges 313F of the locking portion 312F of the locker slot 31F are locked at the two opposed neighboring locking slits 23D to securely engage the head portion 11D of the binding member 10D with the tail portion 12D thereof.

Figure 13:
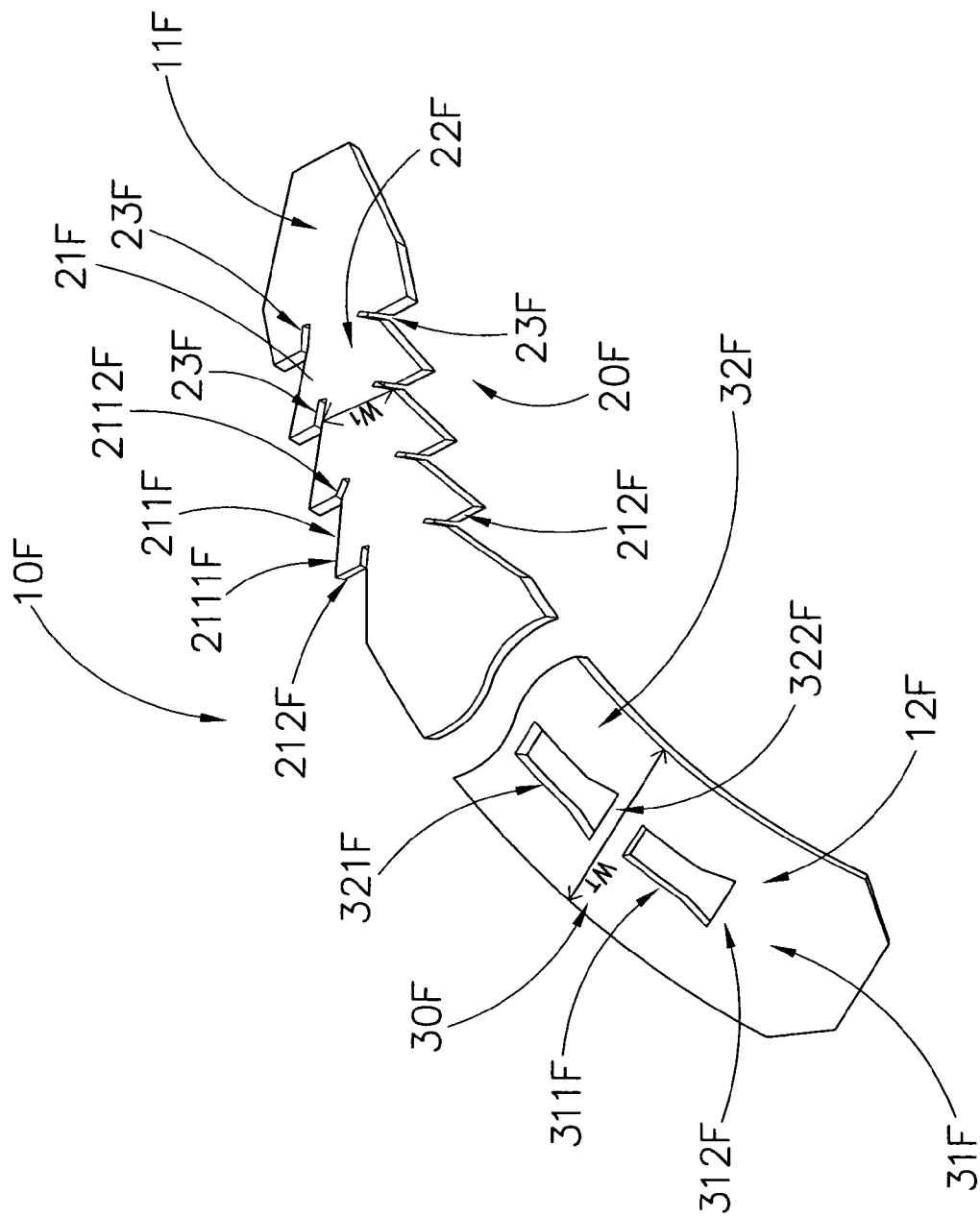
FIG. 13 is a perspective view of an adjustable and detachable binding device according to a fourth preferred embodiment of the present invention.
Figure 14:
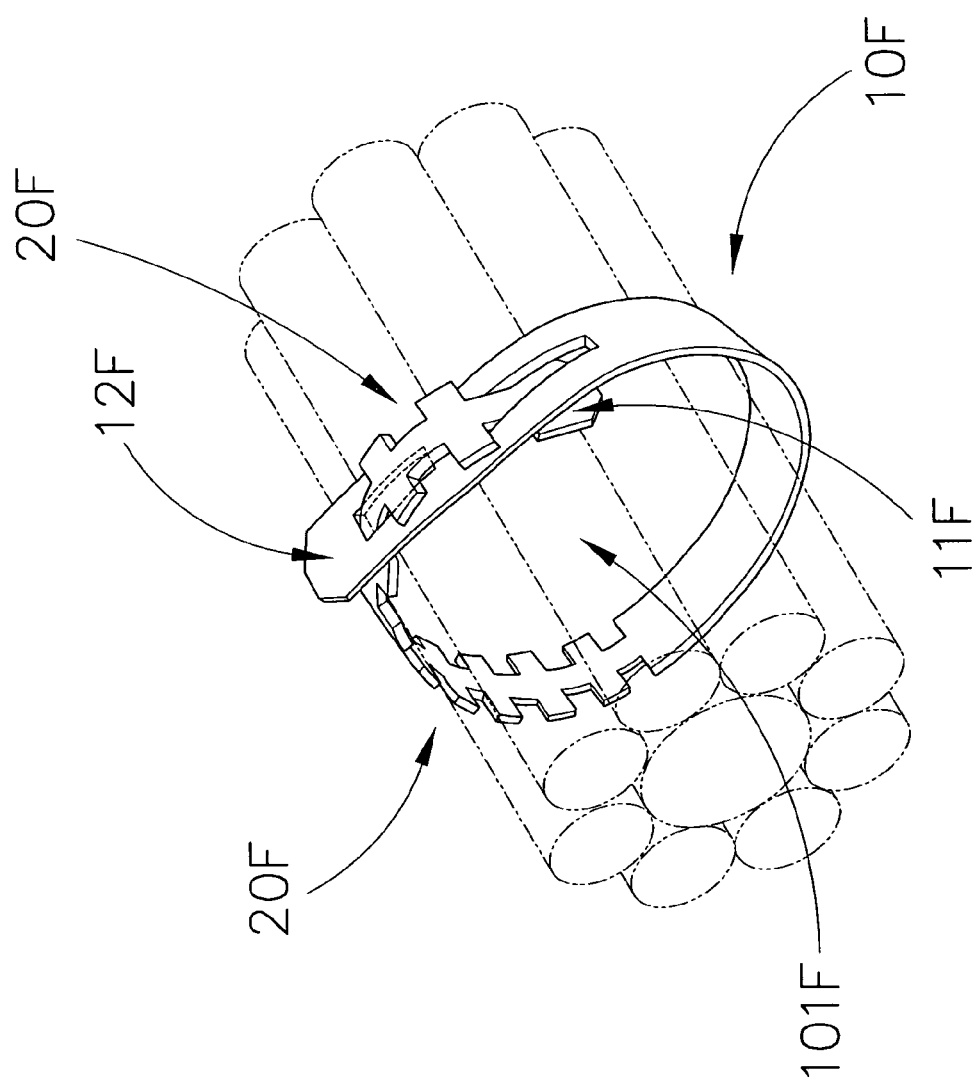
FIG. 14 is a first schematic view of the adjustable and detachable binding device according to the above fourth preferred embodiment of the present invention.

Referring to FIG. 13 to FIG. 14 of the drawings, an adjustable and detachable binding device according to a fourth preferred embodiment of the present invention is illustrated, in which the adjustable and detachable binding device for binding up an object comprises an elongated binding member 10F. Accordingly, the adjustable and detachable binding device of the fourth embodiment illustrates an alternative mode of the third embodiment of the present invention.

The elongated binding member 10F, which has a length substantially longer than a diameter of the object, having a head end, and an opposed tail end, wherein a plurality of locking holders 20F are spacedly and integrally formed along the tail portion 12F of the binding member 10F, wherein a loop locker 30F, containing a first and a second elongated locker slots 31F, 32F, are integrally and spacedly formed at the head portion 11F of the binding member 10F to detachably engage with one of the locking holders 20F to form a binding loop of the binding member 10F for fittingly binding up the object.

Each of the locker slots 31F, 32F has a longitudinal length substantially larger than the width of the binding member 10F, and a transverse width which is larger than a thickness of the binding member and is larger than the width of the holding neck portion of each of the locking holders 20F, in such a manner that the tail portion 12F of the binding member 10F is arranged to twisted at a first angle to align to and pass through the longitudinal length of the first locker slot 31F, and then twisted back at an opposed angle to overlap on an inner side of the head portion 11F thereof so as to allow the head portion 11F to be subsequently twisted to continually pass through the longitudinal length of the second locker slot 32F from the inner side of the head portion, and twisted backed to overlap on the an outer side of the head portion 11F of the elongated binding member 10F.

The binding member 10F is therefore adapted to be bent between a matting position and a locking position, wherein at the matting position, the loop locker 30F is guided to one of the locking holders 20F so as to selectively adjust a diameter of the binding loop, and at the locking position, the locking holder 20F is doubled-locked at the locker slots 31F, 32F to retain the diameter of the binding loop with respect to the object, while the loop locker 30F is allowed to be detached from the respective locking holder 20F when the head portion 11F of the binding member 10F is moved to the matting position.

In other words, when the head portion 11F of the binding member 10F is double-locked at the tail portion 12F thereof, the tail portion 12F is substantially held by the first and the second locker slots 31F, 32F so as to avoid the tail portion 12F swaying around and maximum the strength of the locking effect between the tail portion 12F and the head portion 11F.

According to the fourth preferred embodiment of the present invention, the binding member 10F is an elongated member having a length substantially longer than a diameter of the object. The binding member 10F is made of flexible and durable material, such as plastic, adapted to be bent to form the binding loop 101 in a circular shape.

As in the first preferred embodiment, the locking holders 20F are respectively embodied as a plurality of locking teeth 21F integrally and alignedly formed along a longitudinal edge of the tail portion 12F of the binding member 10F to define a holding neck portion 22F on the binding member 10F at a root portion of each of the locking teeth 21F. The holding neck portion 22F of each of the locking teeth 21F has a width $W_1$ smaller than a width $W_T$ of the binding member 10F, wherein the loop locker 30F comprises means for detachably engaging with the holding neck portion 22F of the respective locking tooth 21F to form the binding loop.

Each of the locking tooth 21F has a guiding edge 211F having an outer end 2111F formed at the longitudinal edge of the tail portion 12F of the binding member 10F and an inner end 2112F inclinedly and inwardly extended on the binding member 10F towards the tail end thereof to define the holding neck portion 22F on the binding member 10F at the inner end 2112F of the guiding edge 211F of each of the locking teeth 21F.

Each of the locking teeth 21F further has a locking edge 212F transversely and inwardly extended from the outer end 2111F of the guiding edge 211F to the inner end 2112F of the adjacent guiding edge 211F such that the locking teeth 21F are continuously extended along the longitudinal edge of the tail portion 12F of the binding member 10F.

It is worth mentioning that the guiding edge 211F of each of the locking teeth 21F is extended inclinedly at a direction corresponding to an inserting direction of the tail portion 12F of the binding member 10F such that the locking teeth 21F are allowed to slide through the first and the second locker slot 31F, 32F at the inserting direction while the locking teeth 21F are blocked up at the transverse width W at an ejecting direction which is opposed to the inserting direction. As a slight alternative, the guiding edge 211F can be longitudinally extended (with respect to the binding member 10F) between each two locking teeth 21F, as shown in FIG. 14 of the drawings.

Each of the locking teeth 21F further has a locking slit 23F inwardly extended from the inner end 2112F of the respective locking teeth 21F at the holding neck portion 22F thereof. Each of the locking slits 23F has two slit edges 231F parallelly extending at the holding neck portion 22F on the binding member 10F to engage with the respective longitudinal edge 313F of the locker slot 31F. In other words, one of the slit edges 231F of the locking tooth 21F is extended from the guiding edge 211F of the corresponding locking tooth 21F while another slit edge 231F of the locking tooth 21F is extended from the locking edge 212F of the respective locking tooth 21F. Preferably, a distance between the slit edges 231F of each of the locking teeth 21F (i.e. the width of the locking slit 23F) is slightly larger than a thickness of the binding member 10F. Therefore, when the respective locking tooth 21F is engaged with the respective locker slot 31F, 32F, the longitudinal edges 313F of the respective locker slot 31F, 32F are substantially engaged with the respective locking slits 23F between the slit edges 231F so as to lock up the head portion 11F of the binding member 10F with the tail portion 12F thereof to form the binding loop 101F.

Accordingly, a plurality of cuts are inclinedly formed at the inner ends 2112F of the locking teeth 21F to form the locking slits 23F at the holding neck portion 22F respectively, wherein the two slit edges 231F of each of the locking slits 23F are parallelly extended at the respective holding neck portion 22F to have a uniform width between the two slit edges 231F. In other words, the locking slits 23F are inclinedly extended at inserting direction of the tail portion 12F of the binding member 10F. It is worth to mention that the locking slits 23F can be inclinedly extended to align with the guiding edges 211F of the locking teeth 21F. Preferably, the locking slits 23F are inclinedly extended not to align with the guiding edges 211D of the locking teeth 21F. In other words, an opening of each of the locking slits 23F is formed at the inner end of the respective locking tooth 21F. Therefore, the third embodiment can be modified by adding one or more locker slot 31F, 32F to form the fourth embodiment.

Hence, while sliding the tail portion 12F of the binding member 10F through the first and the second locker slot 31F, 32F at the inserting direction, the inclined guiding edges 211F of the locking teeth 21F guide the tail portion 12F of the binding member 10F to slide through the locker slot 31F so as to prevent a tearing force applied at the tail portion 12F of the binding member 10F which may tear off the locking teeth 21F. In addition, when a pulling force applied on the binding member 10F at the ejecting direction, the locking edge 212F of the respective locking tooth 21F is substantially biased against the head portion 11F of the binding member 10F such that the pulling force can ensure the locking engagement between the locker slot 31F and the respective locking tooth 21F.

According to the fourth preferred embodiment of the present invention, each of the locker slots 31F, 32F has a longitudinal engaging portion 311F (321F) having a width larger than the thickness of the binding member 10F and a longitudinal locking portion 312F (322F) integrally extended from the engaging portion 311F (321F) towards the head end of the binding member 10F, wherein the locking portion 312F (322F) has a width gradually increasing from the respective engaging portion 311F (321F) in such a manner that when the respective locking tooth 21F is locked at the corresponding locker slot 31F (32F) after the tail portion 12F of the binding member 10F is slid through the corresponding locker slot 31F (32F), the holding neck portion 22F of the respective locking tooth 21F is retained at the locking portion 312F (321F) of the locker slot 31F (32F).

It is worth mentioning that each of the locker slots 31F, 32F can be formed as a triangular shape as shown in FIGS. 9 and 10 that each of the locker slots 31F, 32F has a width gradually increasing towards the head end of the binding member 10F. Therefore, the tail portion 12F of the binding member 10F is slidably engaged with the head portion 11F thereof to form the loop that the respective locking tooth 21F is engaged with the triangular locker slots for being is doubled-locked.

Figure 15:
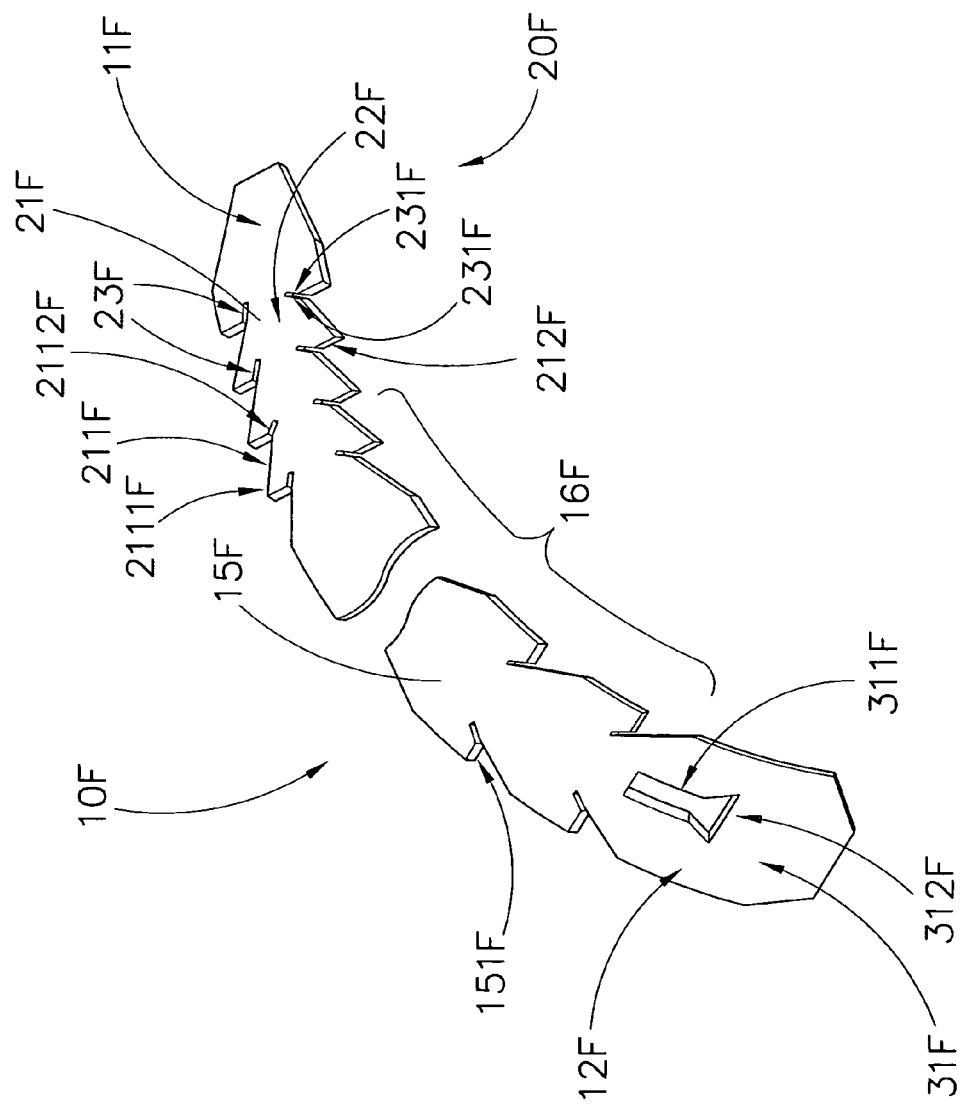
FIG. 15 is a second schematic view of the adjustable and detachable binding device according to the above fourth preferred embodiment of the present invention.
Figure 16:
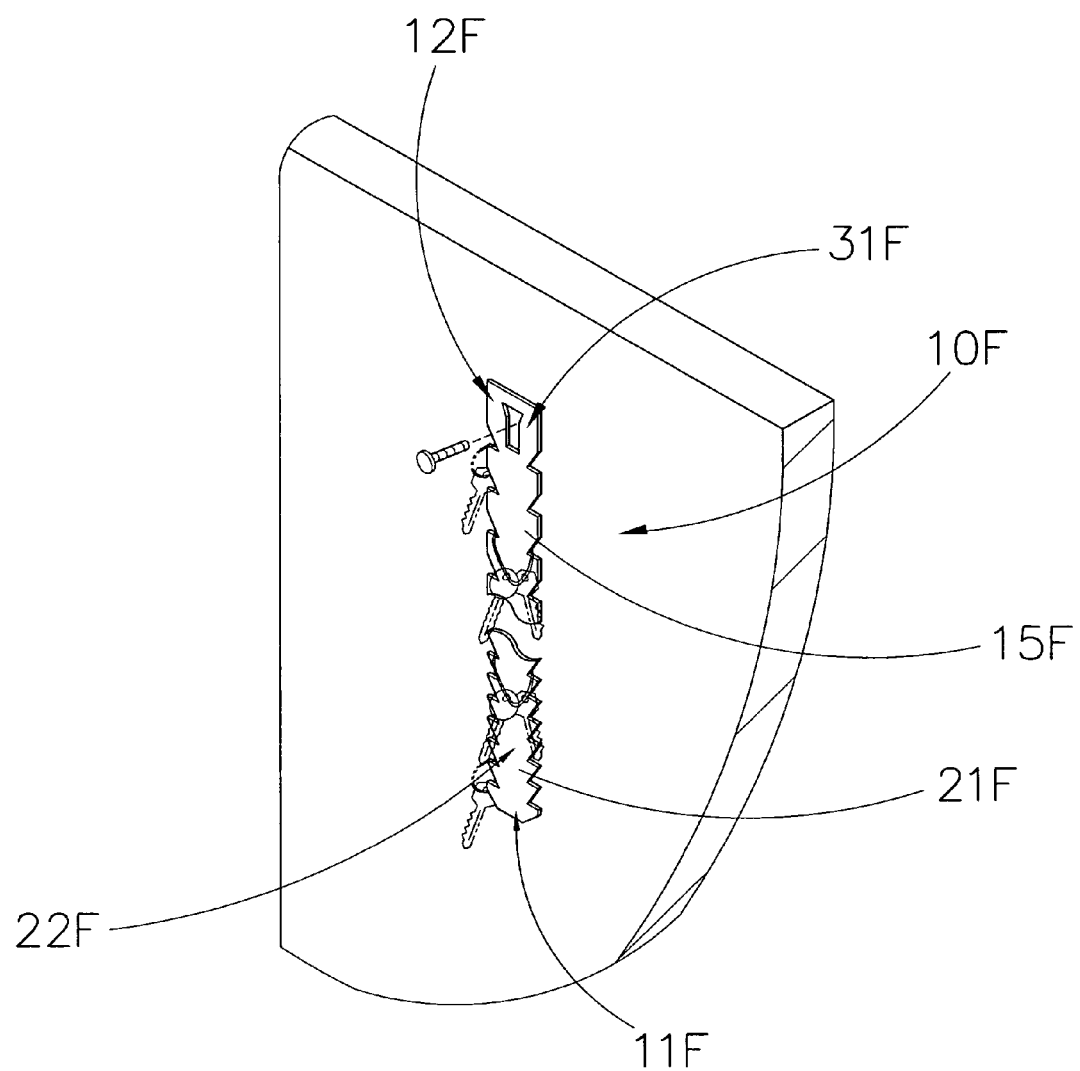
FIG. 16 is a third schematic view of the adjustable and detachable binding device according to the above fourth preferred embodiment of the present invention.

Referring to FIG. 15 and FIG. 16 of the drawings, the binding member 10F further comprises a plurality of displaying teeth 15F frontwardly and integrally formed from the tail portion 12F of the binding member 10F (i.e. the mid portion 16F of the binding member 10F), wherein each of the displaying teeth 15F has a shape substantially the same as each of the locking teeth 21F, but has a size greater than that of each of the locking teeth 21F. As shown in FIG. 15 of the drawings, each of the displaying teeth 15F has a locking edge 151F transversely and inwardly extended from an outer edge mid portion 16F of the binding member 10F primarily for supporting an accessory to be displayed by the binding member 10F, and for locking with the head portion 11F of the binding member 10F when it is at the locking position. In other words, the binding device of the present invention can be utilized primarily for binding an object at the binding loop, and when the binding device is idle, the binding member 10F can be utilized for displaying accessories on the displaying teeth 15F.

Moreover, each of the displaying teeth 15F has a twist-guider edge 152F having an outer end formed at the longitudinal edge of the mid portion 16F of the binding member 10F and an inner end inclinedly and inwardly extended on the binding member 10F towards the tail end thereof to define the holding neck portion 22F on the binding member 10F at the inner end of the twist-guider edge 152F of each of the displaying teeth 15F.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adjustable and detachable binding device for binding up one or more objects, comprising:

a binding member, which has a length substantially longer than a diameter of said object, having a head end, an opposed tail end, a head portion defining at said head end, and a tail portion defining at said tail end;

wherein a plurality of locking teeth are spacedly formed along two longitudinal edges of said tail portion of said binding member respectively to define a holding neck portion on said binding member at a root portion of each of said locking teeth, wherein each of said locking teeth has a guiding edge and a locking edge inwardly and inclinedly extended from said respective longitudinal edge of said tail portion of said binding member;

wherein a plurality of locking slits are inwardly extended from said locking teeth at said holding neck portions of said binding member respectively, wherein each of said locking slits has two slit edges extended from said guiding edge and said locking edge of said respective locking tooth respectively to form an opening at an inner end of said respective locking tooth;

wherein a locker slot is integrally and longitudinal formed along said head portion of said binding member to detachably engage with one of said locking teeth to selectively form a binding loop of said binding member for fittingly binding up said object, wherein said locker slot has two longitudinal edges arranged when said respective locking tooth is engaged with said locker slot, said longitudinal edges of said locker slot are substantially engaged with said respective locking slits between said slit edges so as to lock up said head portion of said binding member with said tail portion thereof to form said binding loop.

2. The adjustable and detachable binding device, as recited in claim 1, wherein a width of said locker slot, which is a distance between said two longitudinal edges of said locker slot, is smaller than a width of said holding neck portion of said binding member such that when said locker slot is engaged with said corresponding locking teeth, said two longitudinal edges of said locker slot are engaged with said two corresponding locking slits respectively.

3. The adjustable and detachable binding device, as recited in claim 2, wherein each of said locking slits are extended inclinedly at a direction corresponding to an inserting direction of said tail portion of said binding member through said locker slot.

4. The adjustable and detachable binding device, as recited in claim 1, wherein a plurality of cuts is spacedly and inclinedly formed at said holding neck portions of said binding member to align with said locking teeth to form said locking slits respectively, wherein said two slit edges of each of said locking slits are parallelly extended at said respective holding neck portion to have a uniform width between said two slit edges.

5. The adjustable and detachable binding device, as recited in claim 3, wherein a plurality of cuts is spacedly and inclinedly formed at said holding neck portions of said binding member to align with said locking teeth to form said locking slits respectively, wherein said two slit edges of each of said locking slits are parallelly extended at said respective holding neck portion to have a uniform width between said two slit edges.

6. The adjustable and detachable binding device, as recited in claim 5, wherein said width of each of said locking slits is slightly larger than a thickness of said binding member.

7. The adjustable and detachable binding device, as recited in claim 1, wherein said locker slot, having a triangular shape, has two adjacent edges defining said longitudinal edges respectively and a width gradually increasing towards said head end of said binding member, such that said two adjacent edges of said locker slot are engaged with said corresponding locking slits respectively.

8. The adjustable and detachable binding device, as recited in claim 6, wherein said locker slot, having a triangular shape, has two adjacent edges defining said longitudinal edges respectively and a width gradually increasing towards said head end of said binding member, such that said two adjacent edges of said locker slot are engaged with said corresponding locking slits respectively.

9. The adjustable and detachable binding device, as recited in claim 7, wherein said locker slot further has a guiding width, which is a height of said locker slot, being smaller than a width of said binding member, such that said tail portion of said binding member is twisted to align with said adjacent edge of said locker slot to slidably insert said tail portion of said binding member through said locker slot.

10. The adjustable and detachable binding device, as recited in claim 8, wherein said locker slot further has a guiding width, which is a height of said locker slot, being smaller than a width of said binding member, such that said tail portion of said binding member is twisted to align with said adjacent edge of said locker slot to slidably insert said tail portion of said binding member through said locker slot.

11. The adjustable and detachable binding device, as recited in claim 1, wherein said locker slot, having a rectangular shape, has two adjacent edges defining said longitudinal edges respectively and an even width between said two longitudinal edges, such that said two adjacent edges of said locker slot are engaged with said corresponding locking slits respectively.

12. The adjustable and detachable binding device, as recited in claim 6, wherein said locker slot, having a rectangular shape, has two adjacent edges defining said longitudinal edges respectively and an even width between said two longitudinal edges, such that said two adjacent edges of said locker slot are engaged with said corresponding locking slits respectively.

13. The adjustable and detachable binding device, as recited in claim 11, wherein said locker slot has a longitudinal engaging portion having an even width larger than a thickness of said binding member and a longitudinal locking portion said integrally extended from said engaging portion towards said head end of said binding member, wherein said locking portion of said locker slot has two adjacent edges defining said longitudinal edges respectively and a width gradually increasing towards said head end of said binding member, such that said two adjacent edges of said locking portion of said locker slot are engaged with said corresponding locking slits respectively.

14. The adjustable and detachable binding device, as recited in claim 12, wherein said locker slot has a longitudinal engaging portion having an even width larger than a thickness of said binding member and a longitudinal locking portion said integrally extended from said engaging portion towards said head end of said binding member, wherein said locking portion of said locker slot has two adjacent edges defining said longitudinal edges respectively and a width gradually increasing towards said head end of said binding member, such that said two adjacent edges of said locking portion of said locker slot are engaged with said corresponding locking slits respectively.

15. The adjustable and detachable binding device, as recited in claim 1, wherein a second locker slot are integrally and longitudinal formed along said head portion of said binding member, wherein said two locker slots are spaced apart with each other that said tail portion of said binding member is doubled-locked at said locker slots to retain said diameter of said binding loop with respect to said object.

16. The adjustable and detachable binding device, as recited in claim 6, wherein a second locker slot are integrally and longitudinal formed along said head portion of said binding member, wherein said two locker slots are spaced apart with each other that said tail portion of said binding member is doubled-locked at said locker slots to retain said diameter of said binding loop with respect to said object.

17. The adjustable and detachable binding device, as recited in claim 15, wherein each of said locker slots has a longitudinal engaging portion having a width larger than a thickness of said binding member, and a longitudinal locking portion integrally extended from said engaging portion towards said head end of said binding member, wherein said locking portion has a width gradually increasing from said respective engaging portion in such a manner that when said respective locking tooth is locked at said corresponding locker slot, said holding neck portion of said respective locking tooth is retained at said locking portion of said locker slot.

18. The adjustable and detachable binding device, as recited in claim 16, wherein each of said locker slots has a longitudinal engaging portion having a width larger than a thickness of said binding member, and a longitudinal locking portion integrally extended from said engaging portion towards said head end of said binding member, wherein said locking portion has a width gradually increasing from said respective engaging portion in such a manner that when said respective locking tooth is locked at said corresponding locker slot, said holding neck portion of said respective locking tooth is retained at said locking portion of said locker slot.

19. The adjustable and detachable binding device, as recited in claim 17, wherein each of said first and said second locker slots further has a guiding width, which is a height of said locker slot, being smaller than a width of said binding member, such that said tail portion of said binding member is twisted to align with said adjacent edge of said corresponding locker slot so as to slidably insert said tail portion of said binding member through said corresponding locker slot.

20. The adjustable and detachable binding device, as recited in claim 18, wherein each of said first and said second locker slots further has a guiding width, which is a height of said locker slot, being smaller than a width of said binding member, such that said tail portion of said binding member is twisted to align with said adjacent edge of said corresponding locker slot so as to slidably insert said tail portion of said binding member through said corresponding locker slot.

* * * * *